US011216753B2

(12) United States Patent
Koreishi

(10) Patent No.: US 11,216,753 B2
(45) Date of Patent: Jan. 4, 2022

(54) PARKING MANAGEMENT SYSTEM AND PARKING MANAGEMENT METHOD

(71) Applicant: TOYOTA JIDOSHA KABUSHIKI KAISHA, Toyota (JP)

(72) Inventor: Jun Koreishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 15/928,938

(22) Filed: Mar. 22, 2018

(65) Prior Publication Data
US 2018/0276575 A1 Sep. 27, 2018

(30) Foreign Application Priority Data

Mar. 23, 2017 (JP) .............................. JP2017-058224

(51) Int. Cl.
*G06Q 10/02* (2012.01)
*G06Q 50/30* (2012.01)
(Continued)

(52) U.S. Cl.
CPC .............. *G06Q 10/02* (2013.01); *G06Q 20/08* (2013.01); *G06Q 20/127* (2013.01);
(Continued)

(58) Field of Classification Search
CPC ........ G06Q 10/02; G06Q 20/08; G06Q 50/30; G06Q 20/127; G06Q 20/145; G07F 17/0042
See application file for complete search history.

(56) References Cited

U.S. PATENT DOCUMENTS

| 10,043,388 B1* | 8/2018 | Kahn | ..................... G08G 1/146 |
| 2005/0261945 A1* | 11/2005 | Mougin | ................. G06Q 10/02 |
| | | | 705/5 |

(Continued)

FOREIGN PATENT DOCUMENTS

| CN | 105280011 A | 1/2016 |
| CN | 105427653 A | 3/2016 |

(Continued)

OTHER PUBLICATIONS

Liu, A Study of Mobile Sensing Using Smartphones, International Journal of Distributed Sensor Networks, vol. 2013, Article ID 272916, pp. 1-9 (Year: 2013).*

(Continued)

*Primary Examiner* — Scott M Tungate
(74) *Attorney, Agent, or Firm* — Hunton Andrews Kurth LLP

(57) ABSTRACT

A parking management system includes: a mobile terminal including a user information storage unit configured to store user information, a reading unit configured to read identification information of a parking section from a code correlated with the parking section, a time identifying unit configured to identify a parking start time or a parking end time of a vehicle based on a predetermined input, and a transmission unit configured to transmit parking information including the stored user information, the read identification information, and the identified time to a server; and a server including a parking information storage unit configured to store reservation information for the parking section, a reception unit configured to receive the parking information from the mobile terminal, and a determination unit configured to determine whether parking of the vehicle in the parking section matches reservation details based on the reservation information and the parking information.

12 Claims, 14 Drawing Sheets

(51) Int. Cl.
*G08G 1/14* (2006.01)
*G06Q 20/12* (2012.01)
*G06Q 20/08* (2012.01)
*G07F 17/24* (2006.01)
*G07F 17/00* (2006.01)
*G06Q 20/14* (2012.01)

(52) U.S. Cl.
CPC ........... *G06Q 20/145* (2013.01); *G06Q 50/30* (2013.01); *G07F 17/0042* (2013.01); *G07F 17/24* (2013.01); *G08G 1/144* (2013.01); *G08G 1/149* (2013.01)

(56) References Cited

U.S. PATENT DOCUMENTS

| | | | |
|---|---|---|---|
| 2010/0085214 | A1 | 4/2010 | Kim |
| 2011/0131154 | A1* | 6/2011 | Faber .................... G01C 21/32 705/418 |
| 2012/0130775 | A1* | 5/2012 | Bogaard ............ G06Q 30/0284 705/13 |
| 2014/0365283 | A1* | 12/2014 | Stenneth ............ G06Q 30/0284 705/13 |
| 2015/0051926 | A1* | 2/2015 | Aaron .................... G06Q 10/02 705/5 |
| 2015/0356498 | A1* | 12/2015 | Casanova ............ G06Q 10/087 705/13 |
| 2016/0240083 | A1 | 8/2016 | Chinomi |

FOREIGN PATENT DOCUMENTS

| | | |
|---|---|---|
| CN | 106228840 A | 12/2016 |
| JP | 2004199177 A | 7/2004 |
| JP | 2007079782 A | 3/2007 |
| JP | 2008234456 A | 10/2008 |
| JP | 2010525419 A | 7/2010 |
| JP | 2014006741 A | 1/2014 |
| JP | 2014137804 A | 7/2014 |
| JP | 2014-222477 A | 11/2014 |
| JP | 2015114839 A | 6/2015 |
| JP | 2015114840 A | 6/2015 |
| WO | 2004/015635 A1 | 2/2004 |
| WO | 2008060016 A1 | 5/2008 |
| WO | 2015053122 A1 | 4/2015 |

OTHER PUBLICATIONS

Nawaz, Sarfraz, Christos Efstratiou, and Cecilia Mascolo. "Parksense: A smartphone based sensing system for on-street parking." Proceedings of the 19th annual international conference on Mobile computing & networking. 2013. (Year: 2013).*
U.S. Appl. No. 15/870,918, filed Jan. 13, 2018, 62 pages.
European Office Action, issued from the European Patent Office, issued to EP Application No. 18162639.1 dated May 18, 2021, 8 pages.

* cited by examiner

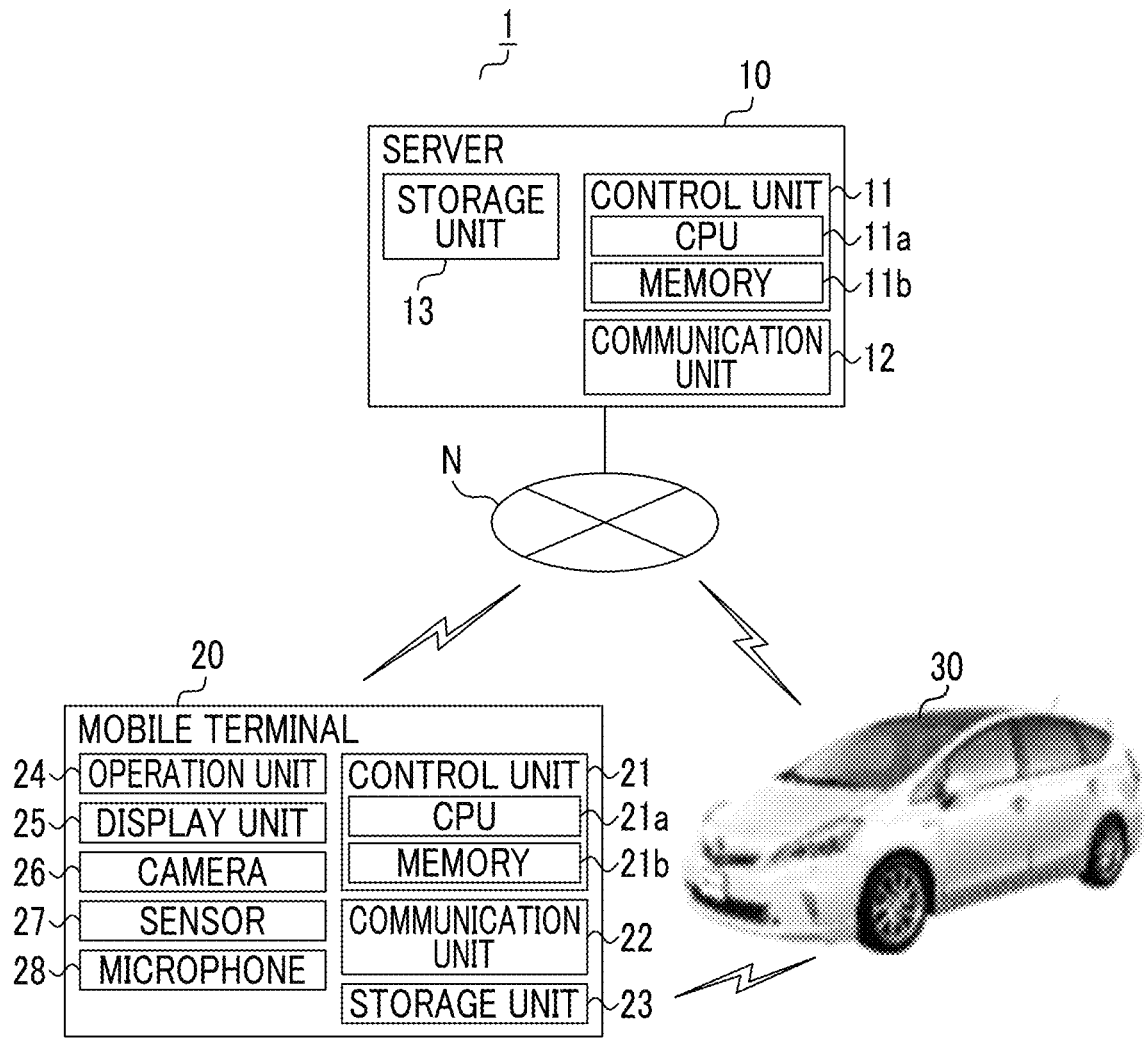
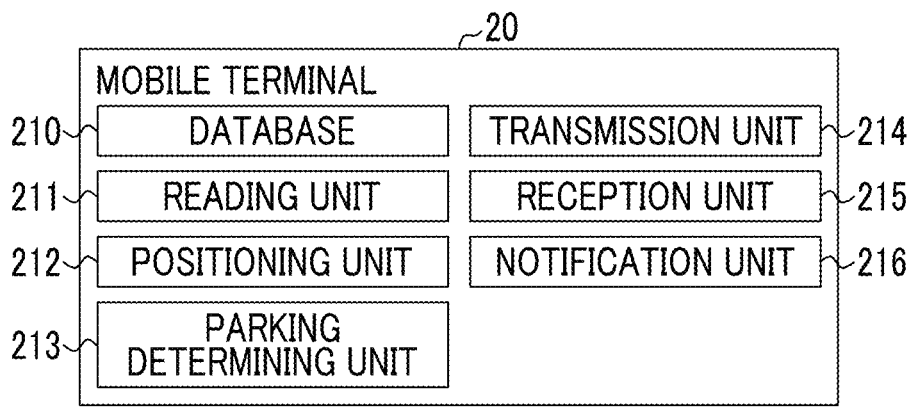

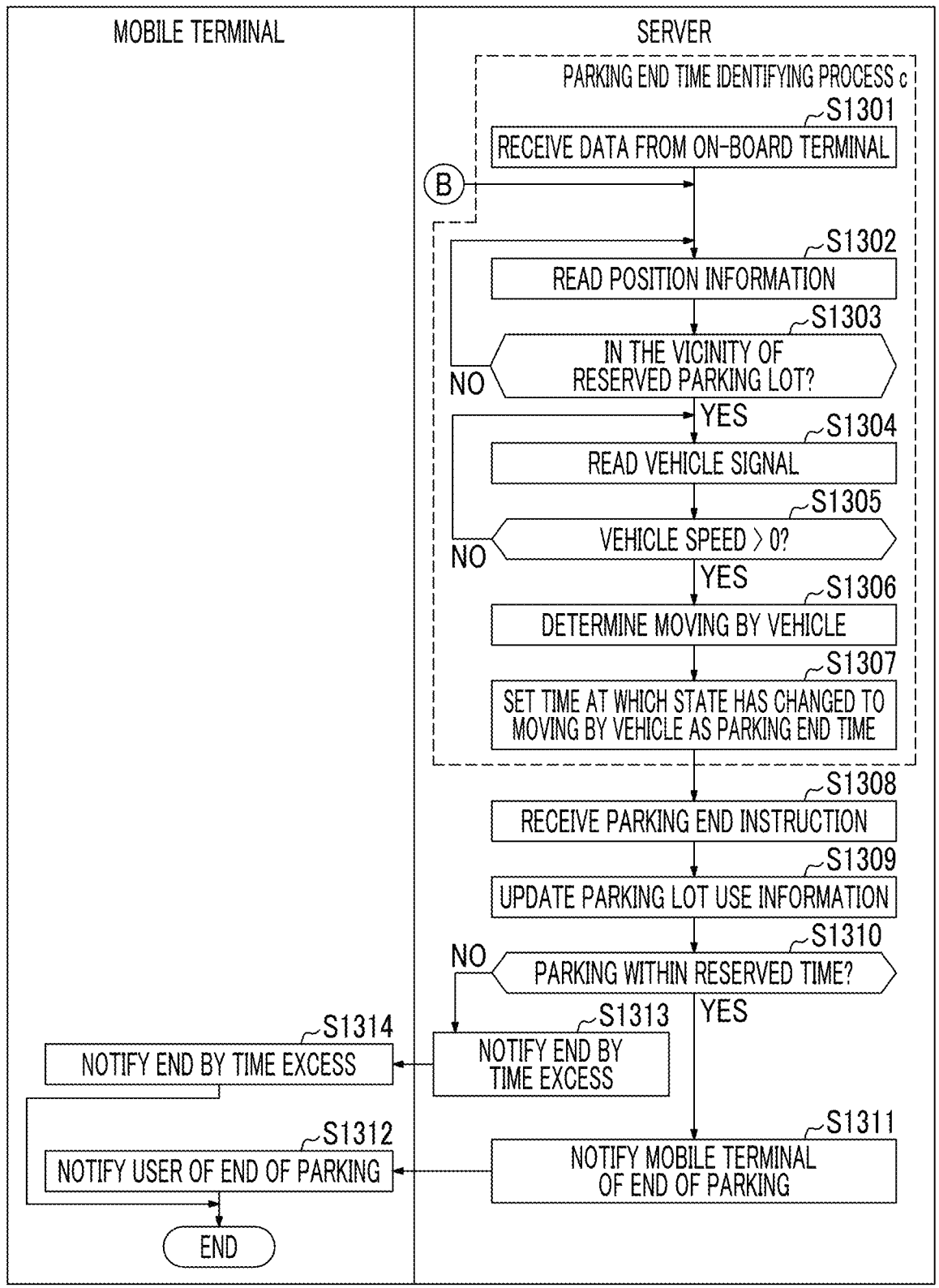

PARKING MANAGEMENT SYSTEM AND PARKING MANAGEMENT METHOD

INCORPORATION BY REFERENCE

The disclosure of Japanese Patent Application No. 2017-058224 filed on Mar. 23, 2017 including the identification, drawings and abstract is incorporated herein by reference in its entirety.

BACKGROUND

1. Technical Field

The disclosure relates to a parking management system and a parking management method.

2. Description of Related Art

A computer system that manages parking of vehicles in a parking lot is known. Japanese Patent Application Publication No. 2014-222477 (JP 2014-222477 A) discloses a parking management system that recognizes vehicle numbers of vehicles which enter and leave a parking lot using a camera installed in the parking lot and manages vehicle information of a vehicle which enters and leaves the parking lot for each vehicle number.

SUMMARY

In a parking management system according to the related art, when there is a difference between details of a registered reservation for a parking lot and an actual parking situation, this difference is not identified. In the related art, for example, a camera has to be installed in the parking lot or the like and costs for installation thereof are incurred.

The disclosure provides a parking management system identifying a difference between details of a registered reservation for a parking lot and an actual parking situation without providing a sensor or device with a high price on a parking lot side.

A parking management system according to a first aspect of the disclosure includes a mobile terminal including a user information storage unit configured to store user information, a reading unit configured to read identification information of a parking section from a code correlated with the parking section, a time identifying unit configured to identify parking time information including a parking start time or a parking end time of a vehicle based on a predetermined input, and a transmission unit configured to transmit parking information to a server, the parking information including the user information, the identification information, and the parking time information; and the server including a parking information storage unit configured to store reservation information for the parking section, a reception unit configured to receive the parking information from the mobile terminal, and a determination unit configured to determine whether parking of the vehicle in the parking section matches reservation details based on the reservation information and the parking information.

In the above aspect, the server may further include: a calculation unit configured to calculate a parking fee for the parking section using the parking information; and a fee notifying unit configured to notify the mobile terminal of the parking fee.

In the above aspect, the server may further include an out-of-reservation parking notifying unit configured to notify the mobile terminal when the determination unit determines that the parking in the parking section does not match the reservation details.

In the above aspect, the time identifying unit may be configured to identify the parking start time or the parking end time based on a reading result by the reading unit.

In the above aspect, the time identifying unit may be configured to identify the parking start time or the parking end time based on a time at which the reading unit reads the identification information.

In the above aspect, the code may be further correlated to time information, the time identifying unit may be configured to identify the parking start time or the parking end time based on the time information read by the reading unit.

In the above aspect, the mobile terminal may further include a sensor unit, and the time identifying unit may be configured to identify the parking start time or the parking end time based on a detection result by the sensor unit.

In the above aspect, the mobile terminal may further include a sensor unit, and the time identifying unit may be configured to: detect a start of parking or an end of parking based on a detection result by the sensor unit; and, identify the parking start time or the parking end time based on a time at which the start of parking or the end of parking is detected.

In the above aspect, the time identifying unit may identify the parking start time or the parking end time based on a vehicle signal received from the vehicle.

In the above aspect, the time identifying unit may be configured to: detect a start of parking or an end of parking based on a vehicle signal from the vehicle; and identify the parking start time or the parking end time based on a time at which the start of parking or the end of parking is detected.

In the above aspect, the code may be a two-dimensional code image.

A parking management method according to a second aspect of the disclosure includes: storing user information using a mobile terminal; reading identification information of a parking section from a code correlated with the parking section using the mobile terminal; identifying parking time information including a parking start time or a parking end time of a vehicle based on a predetermined input using the mobile terminal; transmitting parking information including the user information, the identification information, and the parking time information to a server using the mobile terminal; storing reservation information for the parking section using the server; receiving the parking information from the mobile terminal using the server; and determining whether parking of the vehicle in the parking section matches reservation details based on the reservation information and the parking information using the server.

A parking management system according to a third aspect of the disclosure includes: a mobile terminal programmed to store user information, read identification information of a parking section from a code correlated with the parking section, identify parking time information including a parking start time or a parking end time, and transmit parking information including the user information, the identification information, and the parking time information to a server; and the server programmed to store reservation information for the parking section, receive the parking information from the mobile terminal, and determine whether parking of a vehicle in the parking section matches reservation details based on the reservation information and the parking information.

According to the above aspect, it is possible to provide a technique for identifying a difference between details of a registered reservation for a parking lot and an actual parking situation at a low cost without providing a sensor or device with a high price on a parking lot side.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a diagram schematically illustrating an example of a configuration of a parking management system according to an embodiment;

FIG. 2 is a diagram illustrating an example of a functional configuration of a mobile terminal according to the embodiment;

FIG. 17 is a diagram illustrating an example of a process flow in the parking management system according to the embodiment.

DETAILED DESCRIPTION OF EMBODIMENTS

Figure 3:
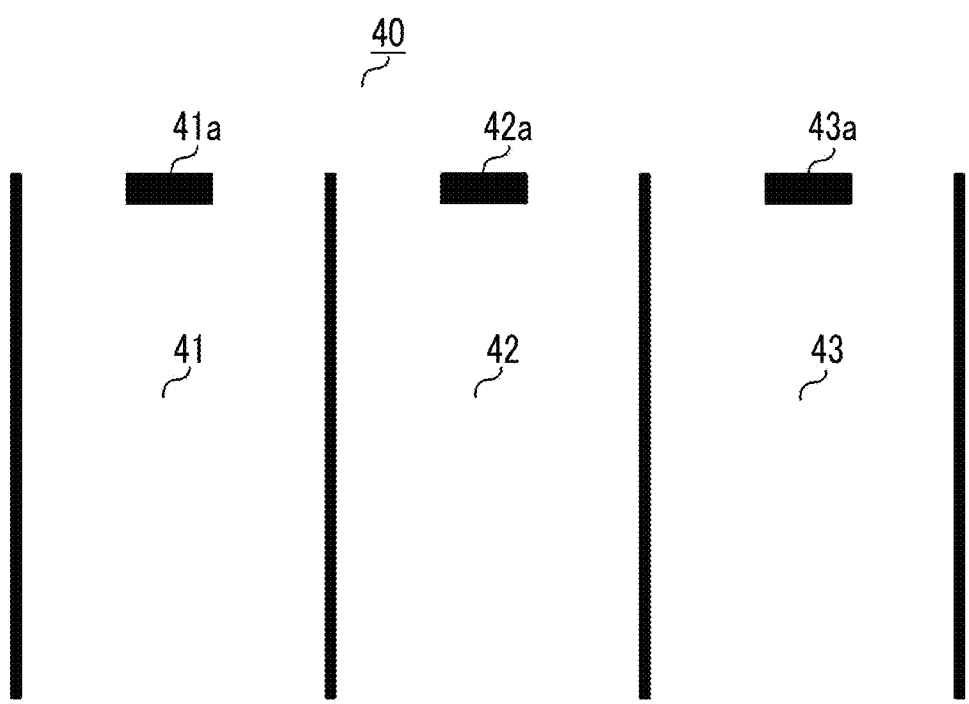
FIG. 3 is a diagram illustrating an example of a parking section according to the embodiment.

Hereinafter, embodiments of the disclosure will be described in detail with reference to the accompanying drawings. The scope of the disclosure is not limited to the embodiments.

1. Hardware Configuration

An example of a hardware configuration of a parking management system according to an embodiment will be described below with reference to FIG. 1. The parking management system 1 is a computer system for managing parking (entrance and exit) of a vehicle in a parking lot. The parking management system 1 mainly includes a server 10, a mobile terminal 20, and a vehicle 30. The mobile terminal 20 and the vehicle 30 can communicate with the server 10 via a network N. The mobile terminal 20 can communicate with the vehicle 30 (for example, via Bluetooth (registered trademark) or Wi-Fi (registered trademark)). The parking management system 1 can provide various services for managing parking of the vehicle 30 which is driven by a user carrying the mobile terminal 20 in a parking lot to the user and an owner of the parking lot. In FIG. 1, the parking management system 1 includes a single mobile terminal 20 and a single vehicle 30, but the parking management system 1 can include a plurality of mobile terminals 20 and a plurality of vehicles 30.

The network N is a communication line for transmitting and receiving information between the server 10, the mobile terminal 20, and the vehicle 30. The network N may be any one of, for example, the Internet, a packet communication network, a telephone line, another communication line, and a combination thereof, regardless of whether the network is wired, wireless, or a combination thereof.

The server 10 is constituted by an information processing device such as a dedicated or general-purpose computer. The server 10 may include a single information processing device or may include a plurality of information processing devices which are distributed over the network.

The server 10 mainly includes a control unit 11, a communication unit 12, and a storage unit 13. The control unit 11 mainly includes a central processing unit (CPU) 11a and a memory 11b. These elements will be described later. The server 10 functions as means for implementing various functions, for example, by causing the CPU 11a to execute a predetermined program stored in the memory 11b or the like. FIG. 1 illustrates only principal elements of the server 10, and the server 10 includes other elements which are included in a general information processing device.

The control unit 11 controls operations of various elements of the server 10 and controls execution of various processes. Details of an example of processes which are performed by the control unit 11 will be described later. The communication unit 12 is a communication interface for communication with an external device. The storage unit 13 is constituted by a storage device such as a hard disk. The storage unit 13 stores various programs or a variety of information which is required for performing processes in the server 10.

The mobile terminal 20 is a mobile information processing device (a mobile terminal device) such as a mobile phone (which includes a smartphone), a tablet terminal, a personal digital assistants (PDA), a navigation device, or a personal computer. The mobile terminal 20 mainly includes a control unit 21, a communication unit 22, a storage unit 23, an operation unit 24, a display unit 25, a camera 26, a sensor 27, and a microphone 28. The control unit 21 mainly includes a CPU 21a and a memory 21b. The mobile terminal 20 functions as means for implementing various functions, for example, by causing the CPU 21a to execute a predetermined program stored in the memory 21b or the like.

The control unit 21 controls operations of various elements of the mobile terminal 20 and controls execution of various processes. Details of an example of processes which are performed by the control unit 21 will be described later. The communication unit 22 is a communication interface for communication with an external device. The storage unit 23 is constituted by a storage device such as a semiconductor memory. The storage unit 23 stores various programs or a variety of information which is required for performing processes in the mobile terminal 20. The operation unit 24 is a user interface for receiving an operation instruction from a user. The display unit 25 is a user interface for displaying processing results of the mobile terminal 20. The camera 26 is a device that can take a still image or a moving image.

The sensor 27 includes various sensors. The sensor 27 includes, for example, a gyro sensor, an acceleration sensor, a geomagnetic sensor, a sound sensor, and/or an image sensor. The microphone 28 is a device that acquires sound information by converting speech/sound uttered by a user carrying the mobile terminal 20 into an electrical signal.

The vehicle 30 is an arbitrary vehicle that can be parked in a parking lot. The vehicle 30 is driven by a user of the mobile terminal 20. The vehicle 30 includes the same hardware elements including the control unit 21, the communication unit 22, the storage unit 23, the operation unit 24, the display unit 25, the camera 26, and the sensor 27 illustrated in FIG. 1 as the hardware elements of the mobile terminal 20. Such elements included in the vehicle 30 can be identified as an on-board terminal. The vehicle 30 further includes elements which are included in a general vehicle.

As described above, in this embodiment, the parking management system 1 includes the server 10, the mobile terminal 20, and the vehicle 30, but is not limited thereto and may include arbitrary devices. A configuration including some of the elements of the server 10, the mobile terminal 20, and the vehicle 30 can be understood as the parking management system 1.

2. Functional Configuration

An example of functional configurations of the devices which are included in the parking management system according to the embodiment will be described below. First, the functional configuration of the mobile terminal 20 will be described with reference to FIG. 2. The mobile terminal 20 includes a database 210, a reading unit 211, a positioning unit 212, a parking determining unit 213, a transmission unit 214, a reception unit 215, and a notification unit 216 as main functional elements. The mobile terminal 20 implements the functional elements illustrated in FIG. 2, for example, by causing the CPU 21a to execute a predetermined program stored in the memory 21b or the like and to cooperate with hardware of the mobile terminal 20. Details of the functional elements will be described below.

The database 210 stores a variety of information such as information required for processes which are performed by the mobile terminal 20 and information generated through the processes. The database 210 stores, for example, user information such as a user ID of the mobile terminal 20 or data of application programs installed in the mobile terminal 20.

The reading unit 211 can read position information (identification information of a parking section) correlated with each parking section from a code recognized via the camera 26 or the like. For example, a two-dimensional code (a two-dimensional code image) such as a chameleon code or a QR code (registered trademark) may be attached to each parking section of a parking lot. When a user operates the mobile terminal 20 to image the two-dimensional code using the camera 26, the reading unit 211 can read (acquire) identification information of the parking section from the code image acquired by the camera 26. The code attached to each parking section includes coded position information (or identification information of the parking section) for the corresponding parking section. Accordingly, the reading unit 211 can read the position information or the identification information of the parking section from the code correlated with the parking section. Furthermore, information which indicates time may be correlated to the two-dimensional code.

An example of a code attached to the parking section will be described below with reference to FIG. 3. In FIG. 3, a parking lot 40 includes parking sections 41, 42, and 43, and two-dimensional codes 41a, 42a, and 43a are attached in correlation with the parking sections. In the two-dimensional codes 41a, 42a, and 43a, information for identifying the parking sections 41, 42, and 43 (for example, position information of the parking sections) is coded. For example, when a user of the mobile terminal 20 which has caused the vehicle 30 to enter the parking section 41 images the two-dimensional code 41a using the camera 26 of the mobile terminal 20, the reading unit 211 can acquire information of the parking section 41 (for example, position information of the parking section 41) from an image of the two-dimensional code 41a.

In the example illustrated in FIG. 3, the two-dimensional codes 41a, 42a, and 43a are attached in correlation with the parking sections, but the disclosure is not limited to this example. The two-dimensional codes 41a, 42a, and 43a may be attached to a support member such as a pylon or a pole installed in each parking section. The code correlated with each parking section may employ an arbitrary type of code such as a one-dimensional code or a three-dimensional code instead of a two-dimensional code.

Referring back to FIG. 2, the positioning unit 212 performs a process of identifying a position (for example, latitude and longitude) of the mobile terminal 20 (a host device) based on a signal received from global positioning system (GPS) satellites or a communication device (for example, a base station) by the mobile terminal 20 and identifying a time at which the position is identified (that is, identifying positioning information).

The parking determining unit 213 can determine start of parking and end of parking of the vehicle 30 in the parking lot 40. For example, the parking determining unit 213 can determine the start of parking and the end of parking of the vehicle 30 in the parking lot 40 based on the position of the mobile terminal 20 identified by the positioning unit 212 and the detection result (a state of the mobile terminal 20 or a user state of the mobile terminal 20) from the sensor 27. Specifically, when the position of the mobile terminal 20 identified by the positioning unit 212 is in the parking lot 40 and the sensor 27 detects that the mobile terminal 20 has changed from an onboard (moving in a vehicle) state to a not onboard state, the parking determining unit 213 can determine that parking of the vehicle 30 has started. When the position of the mobile terminal 20 identified by the positioning unit 212 is in the parking lot 40 and the sensor 27 detects that the mobile terminal 20 has changed from the not onboard state to the onboard (moving in a vehicle) state, the parking determining unit 213 can determine that parking of the vehicle 30 has ended.

The parking determining unit 213 can determine in which state (for example, which of being onboard (moving in a vehicle), walking (moving on foot), or another state (for example, moving in a subway)) the user of the mobile terminal 20 is based on the detection result from the sensor 27, and can more accurately perform the determination by determining the start/end of parking of the vehicle 30 using the determination result.

For example, when the position of the mobile terminal 20 identified by the positioning unit 212 is in the parking lot 40 and the user state of the mobile terminal 20 has changed from being onboard (traveling in a vehicle) to walking or stopped, the parking determining unit 213 can determine that parking of the vehicle 30 has started. When the position of the mobile terminal 20 identified by the positioning unit 212 is in the parking lot 40 and the user state of the mobile terminal 20 has changed from walking or stopped to being onboard (moving in a vehicle), the parking determining unit 213 can determine that parking of the vehicle 30 has ended.

Here, the determination of in which state of stopped, being onboard (moving in a vehicle), walking (moving on foot), and another state (for example, moving in a subway) the user of the mobile terminal 20 is based on the detection result from the sensor 27 can be performed by an arbitrary method. For example, when the user state is stopped, being onboard, walking, and traveling, features are calculated based on the detection results from the acceleration sensor and the geomagnetic sensor which are mounted in the mobile terminal, and the user states and the features may be correlated with each other by machine learning. The parking determining unit 213 can determine the user state of the mobile terminal 20 based on the correlated information and the detection result from the sensor 27.

The parking determining unit 213 can identify a time at which parking of the vehicle 30 starts (a parking start time) and a time at which parking of the vehicle 30 ends (a parking end time). The parking determining unit 213 can identify the parking start time and the parking end time using various methods. For example, the parking determining unit 213 can identify the parking start time and the parking end time based on reading results from the reading unit 211. For example, based on a time at which identification information of a parking section is read from a two-dimensional code image, the parking determining unit 213 identifies the parking start time and the parking end time. Furthermore, when the two-dimensional code is correlated to the information which indicates the time, the parking determining unit 213 may identify the parking start time and the parking end time based on the read information which gives the time. The parking determining unit 213 can identify the parking start time and the parking end time based on times at which it is determined that parking starts and parking ends using the detection result from the sensor 27 or the like as described above. The parking determining unit 213 can identify the parking start time and the parking end time based on the type of a vehicle signal received from the vehicle 30 and a reception time thereof. The vehicle signal includes, for example, an ACC signal (an accessory signal), an AT (automatic) shift signal, an IG (ignition) signal, and/or a vehicle speed signal. For example, the parking determining unit 213 can identify the parking start time based on a time at which a shift signal indicating parking is received and can identify the parking end time based on a time at which the vehicle speed signal indicates change from 0 km/h to higher than 0 km/h.

The transmission unit 214 transmits information of the processing results in the mobile terminal 20 and information stored in the mobile terminal 20 to the outside. For example, the transmission unit 214 can transmit user information of the mobile terminal 20 stored in the database 210, identification information of a parking section read by the reading unit 211 (that is, identification information of a parking section read from a code image acquired by the camera 26), and information including the parking start time or the parking end time identified by the parking determining unit 213 as parking information to the server 10. The transmission unit 214 can transmit parking reservation information to the server 10 in response to a user input. The parking reservation information is information of a parking reservation request for a parking lot. Specifically, the parking reservation information includes the information of the user who requests the reservation, a requested parking lot, a requested parking start time and a requested parking end time. The transmission unit 214 can also transmit the user information and the identification information of a parking section at a time corresponding to a user operation (for example, pressing of a parking start button or a parking end button) and can transmit the parking start time or the parking end time at a time which is identified by the parking determining unit 213.

The reception unit 215 receives a variety of information from an external device outside the mobile terminal 20. For example, the reception unit 215 can receive a variety of information such as a time at which the user of the mobile terminal 20 parks the vehicle 30 in the parking lot 40, information of a parking fee, and a notification relevant to parking from the server 10.

The notification unit 216 gives a variety of notifications to the user of the mobile terminal 20. For example, when identification information correlated with the parking section has not been read by the reading unit 211 even if a predetermined time (for example, 10 minutes) has elapsed after the parking determining unit 213 has determined that parking of the vehicle 30 has started, the notification unit 216 can give a notification thereof to the user. The notification unit 216 can present (give) a notification received from the server 10 to the user.

The notification unit 216 can give a notification using an arbitrary method. For example, notification details may be displayed on the display unit 25, a notification may be given by a speaker (not illustrated) included in the mobile terminal 20, or a notification may be given by causing the mobile terminal 20 to vibrate. A notification may be given by combining all or some of the above-mentioned notification methods.

As described above, according to the embodiment, the mobile terminal 20 can read identification information of a parking section using the reading unit 211, and can transmit the user information of the mobile terminal 20 stored in the database 210, the read identification information of the parking section, and information including the parking start time or the parking end time as parking information to the server 10 using the transmission unit 214. As a result, it is possible to transmit information required for parking management of a parked vehicle to the server 10 without installing a device such as a camera in the parking lot 40 to recognize a parked vehicle. That is, according to the embodiment, it is possible to implement parking management of a vehicle at a lower cost.

Figure 4:
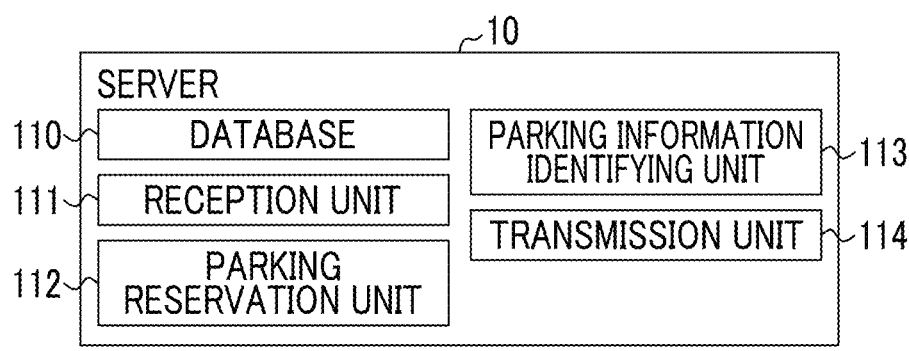
FIG. 4 is a diagram illustrating an example of a functional configuration of a server according to the embodiment.

The functional configuration of the server 10 will be described below with reference to FIG. 4. The server 10 includes a database 110, a reception unit 111, a parking reservation unit 112, a parking information identifying unit 113, and a transmission unit 114 as main functional elements. The server 10 implements the functional elements illustrated in FIG. 4, for example, by causing the CPU 11a to execute a predetermined program stored in the memory 11b or the like and cooperating with hardware of the server 10. Details of the functional elements will be described below.

The database 110 stores a variety of information such as information required for processes which are performed by the server 10, information generated through the processes, and information received from an external device. The database 110 stores, for example, information of registered users, information of registered parking lots, information of parking reservations of a user, information of parking fees, and information of use of a parking lot.

The reception unit 111 receives a variety of information and execution commands of various processes from an external device outside the server 10. For example, the reception unit 111 receives the parking reservation information and the parking information (which includes, for example, parking position information, parking start information (a parking start instruction), and parking end information (a parking end instruction)) transmitted from the transmission unit 214 of the mobile terminal 20. The parking start information (the parking start instruction) includes the parking start time identified by the parking determining unit 213, and the parking end information (the parking end instruction) includes the parking end time identified by the parking determining unit 213.

The parking reservation unit 112 performs a process of registering the parking reservation information received via the reception unit 111 in the database 110 and a process of updating and deleting the registered parking reservation information. Examples of the parking reservation information which is registered and updated in the database 110 include user (subscriber) information, information on parking lots (parking sections) in which parking has been reserved, a reservation start time (a reserved time for start of parking), a reservation end time (a reserved time for end of parking), a parking fee, a parking state (for example, one of not-parked, parked, and parking ended), a parking start time (a time at which parking is actually started), and a parking end time (a time at which parking is actually ended).

The parking information identifying unit 113 identifies information of parking of the vehicle 30 and other vehicles in the parking lot (parking section) as parking information based on the information received by the reception unit 111. For example, the parking information identifying unit 113 can identify the user of the mobile terminal 20, the parking position of the parked vehicle 30 (the parking section in which the vehicle 30 is parked), and at least one of the parking start time and the parking end time. The identified parking information of the vehicle is stored in the database 110 in correlation with the user information of the vehicle based on the parking information transmitted from the mobile terminal 20 and received by the reception unit 111.

The parking information identifying unit 113 determines whether the identified parking information matches details indicated by the parking reservation information registered in the database 110. For example, the parking information identifying unit 113 can identify (determine) whether the user information, the parking position (the parking section), and the parking start time which are indicated by the identified parking information match details indicated by the parking reservation information registered in the database 110.

As described above, according to the embodiment, the parking management system 1 can identify a difference between details of a registered reservation for a parking lot and an actual parking situation.

The parking information identifying unit 113 can identify a parking time of the vehicle 30 based on the parking start information and the parking end information transmitted from the mobile terminal 20 and received by the reception unit 111. The parking information identifying unit 113 can calculate a parking fee of the vehicle 30 based on the parking time of the vehicle 30 and unit parking fee information. The unit parking fee information is acquired, for example, from the database 110.

The transmission unit 114 transmits information of the processing result in the server 10 and information stored in the server 10 to the outside. For example, the transmission unit 114 transmits the parking information of the vehicle 30 identified by the parking information identifying unit 113 and information of the calculated parking fee to the mobile terminal 20. The transmission unit 114 transmits various notifications (messages) to an external device. For example, when it is determined that the parking information identified by the parking information identifying unit 113 does not match the details indicated by the parking reservation information registered in the database 110, the transmission unit 114 notifies the corresponding mobile terminal 20 that the parking is not-reserved parking (transmits a not-reserved parking notification). Examples of a notification transmitted from the transmission unit 114 to the mobile terminal 20 will be listed below.

Examples of Notification (1) Notification 1 when a Parking Lot which has not been Reserved is Used Notification conditions: Parking start information not matching reservation details (or not reserved) has been received from the mobile terminal 20 and a parking section indicated by details of a parking start instruction thereof is currently outside of a reserved time or is currently reserved by another user. Notification details: "Parking in a non-reserved parking lot. Since this parking lot is not currently available, please move. Place: [parking lot name]"

(2) Notification 2 when a Parking Lot which has not been Reserved is Used

Notification conditions: Parking start information not matching reservation details (or not reserved) has been received from the mobile terminal 20 and a parking section indicated by details of a parking start instruction thereof is currently outside of a reserved time or is not currently reserved by another user.

Notification details: "Parking in a non-reserved parking lot. Please move or reserve the parking lot. Place: [parking lot name]"

(3) Notification of Start of Parking

Notification conditions: Parking start information matching reservation details has been received from the mobile terminal 20.

Notification details: "Parking has been started. Place: [parking lot name] Start of reservation: XX:XX End of reservation: XX:XX Reservation fee: XXX yen"

(3a) Notification of Start of Parking Before the Reserved Time

Notification conditions: A parking start instruction is received within a reserved time by the reception unit 111, but the parking start time is before the reserved time.

Notification details: "Parking has been started. Because of parking before the reserved time, an additional fee is charged. Place: [parking lot name] Start of reservation: XX:XX End of reservation: XX:XX Reservation fee: XXX yen Start of parking: XX:XX Additional fee: xxx yen"

(3b) Notification for Promoting Operation of Pressing Parking Start Button

Notification conditions: A parking start time (identified by the parking determining unit 213) has been received by the reception unit 111, but a parking start instruction based on a user operation of the mobile terminal 20 has not been received even if a predetermined time has elapsed thereafter.

Notification details: "Reserved parking lot has been entered. Please press the parking start button".

(3c) Notification for Promoting Operation of Pressing Parking End Button

Notification conditions: A parking end time (identified by the parking determining unit 213) has received by the reception unit 111, but a parking end instruction based on a user operation of the mobile terminal 20 has not been received even if a predetermined time has elapsed thereafter.

Notification details: "Reserved parking lot has been left. Please press the parking end button".

(4) Notification of Start of Parking Before Reserved Time in Available Time

Notification conditions: A parking start instruction has been received before a reservable time by the reception unit 111, the parking start time is within the reserved time, and the parking lot is not currently reserved by another user.

Notification details: "Parking has been started before the reserved time. Since it is an available time, please update the reservation. Place: [parking lot name] Start of reservation: XX:XX End of reservation: XX:XX Reservation fee: XXX yen"

(5) Notification of Start of Parking Before Reserved Time in Unavailable Time

Notification conditions: A parking start instruction has been received before a reserved time by the reception unit 111, and the parking start time is outside of the reserved time or the parking lot is currently reserved by another user.

Notification details: "Parking has been started before the reserved time. Since it is an unavailable time, please move. Place: [parking lot name] Start of reservation: XX:XX End of reservation: XX:XX Reservation fee: XXX yen"

(6) Notification 1 of Approaching Parking End Time

Notification conditions: It is determined that it is a predetermined time before the parking end time during parking, the parking start time is within the reserved time, and the parking lot is not currently reserved by another user.

Notification details: "A reservation end time is coming soon. Please update the reservation when the end time is exceeded. An additional fee of XXX yen is charged every 00 minutes. Place: [parking lot name] Start of reservation: XX:XX End of reservation: XX:XX Reservation fee: XXX yen"

(7) Notification 2 of Approaching Parking End Time

Notification conditions: It is determined that it is a predetermined time before the parking end time during parking, and the parking lot is outside of the reserved time or is currently reserved by another user after the end of reservation.

Notification details: "A reservation end time is coming soon. Please use within the reserved time. Place: [parking lot name] Start of reservation: XX:XX End of reservation: XX:XX Reservation fee: XXX yen"

(8) Notification of Exceeding Parking Time

Notification conditions: It is determined that the vehicle is parked after a reservable time, it is within the reserved time, and the parking lot is not currently reserved by another user.

Notification details: "A reserved time has been exceeded. An additional fee of XXX yen will be charged for every 00 minutes. Place: [parking lot name] Start of reservation: XX:XX End of reservation: XX:XX Reservation fee: XXX yen"

(9) Notification of Exceeding Parking Time and Promoting Movement

Notification conditions: It is determined that the vehicle is parked after the reserved time, it is outside of the reserved time, and the parking lot is currently reserved by another user.

Notification details: "The reserved time has been exceeded. Please move rapidly because this is an unavailable time. Place: [parking lot name] Start of reservation: XX:XX End of reservation: XX:XX Reservation fee: XXX yen"

(10) Notification of End of Parking (End within Reserved Time)

Notification conditions: A parking end instruction has been received within the reserved time.

Notification details: "Parking has ended. There is no additional fee. Place: [parking lot name] Start of reservation: XX:XX End of reservation: XX:XX Reservation fee: XXX yen Start of parking: xx:xx End of parking: xx:xx Charged fee: xxx yen"

(11) Notification of End of Parking (End after Reserved Time)

Notification conditions: A parking end instruction has been received after the reserved time.

Notification details: "Parking has ended. An additional fee is XXX yen. Place: [parking lot name] Start of reservation: XX:XX End of reservation: XX:XX Reservation fee: XXX yen Start of parking: xx:xx End of parking: xx:xx Charged fee: xxx yen"

(12) Notification of Parking Lot Other than that for Parking Start Time

Notification conditions: A parking end instruction has been received in a parking lot which has not been received.

Notification details: "The parking lot is not the parking lot for parking. Please check once more. Place: ["parking lot name]."

3. EXAMPLES

A process flow in a specific example of the parking management system 1 will be described. The same processes as described above will be omitted or only summaries thereof will be described.

3.1 Example 1

Example 1 is an example in which parking management is performed by processes of the server 10 and the mobile terminal 20 in the configuration of the parking management system 1 illustrated in FIG. 1.

Example 1.1

Figure 5:
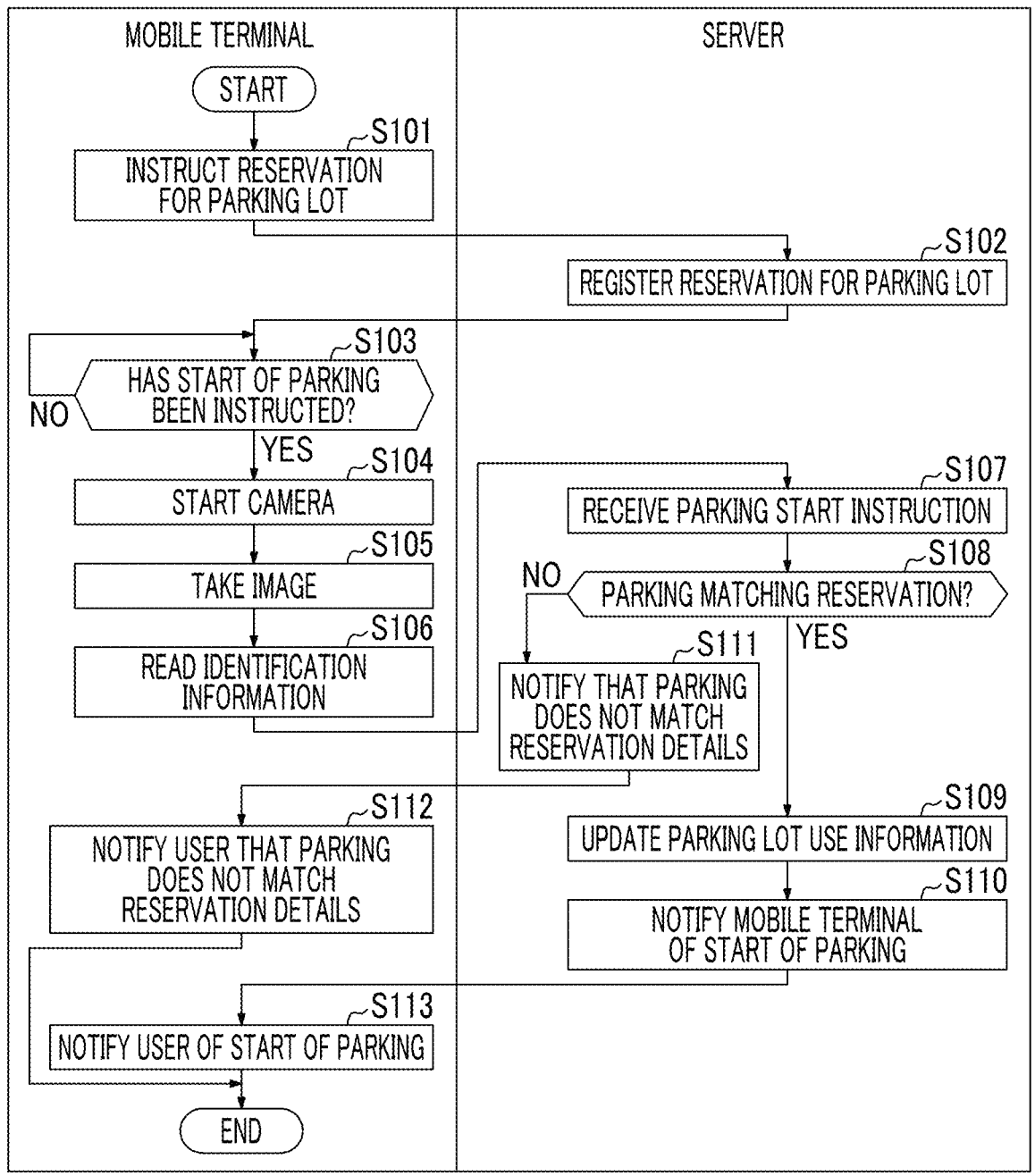
FIG. 5 is a diagram illustrating an example of a process flow in the parking management system according to the embodiment.
Figure 6:
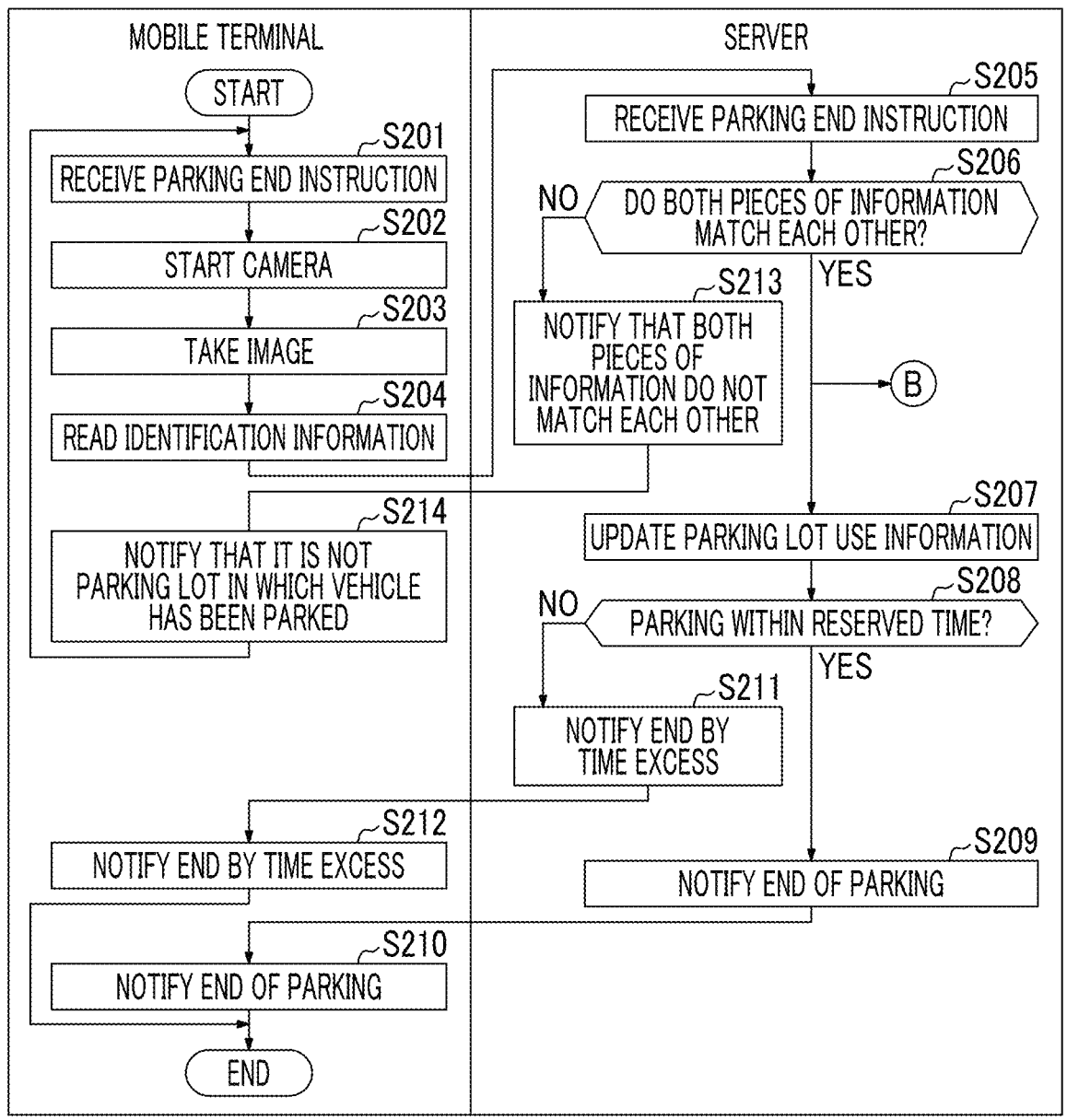
FIG. 6 is a diagram illustrating an example of a process flow in the parking management system according to the embodiment.

An example of a routine of determining start and end of parking of the vehicle 30 in a parking lot in this example will be described below with reference to the flowcharts illustrated in FIGS. 5 and 6. In FIGS. 5 and 6, process steps in an area indicated by "mobile terminal" are process steps which are performed by the mobile terminal 20, and process steps in an area indicated by "server" are process steps which are performed by the server 10. The same is true of other flowcharts.

First, an example of a routine of determining start of parking of the vehicle 30 in a parking lot will be described with reference to FIG. 5.

When a parking lot and a parking section in which the vehicle 30 will be parked are designated by a user operation and a parking reservation instruction is received (Step S101), the mobile terminal 20 transmits information of the received parking reservation information to the server 10. The server 10 registers the parking reservation of the vehicle 30 in the database 110 based on the received parking reservation information (Step S102).

Thereafter, when designation of a parking position and a parking start instruction from the user have been received (YES in Step S103), the mobile terminal 20 starts the camera 26 (Step S104). The mobile terminal 20 images a two-dimensional code installed in the parking section in which the vehicle 30 is parked in accordance with a user's instruction (Step S105). For example, the user parking (entering) the vehicle 30 in the parking section 41 of the parking lot 40 operates the mobile terminal 20 to instruct imaging the two-dimensional code 41a installed in the parking section 41. The mobile terminal 20 reads the identification information of the parking section (parking position information) from an image of the two-dimensional code imaged in Step S105 (Step S106).

Thereafter, a parking start instruction is transmitted from the mobile terminal 20 to the server 10 along with identification information of the parking section, the time at which the identification information is read, and the user information of the mobile terminal 20. The server 10 receives the parking start instruction from the mobile terminal 20 (Step S107).

The server 10 determines whether details of parking of the vehicle 30 which has started match details of the parking reservation based on the information received along with the instruction and the parking reservation information stored in the database 110 (Step S108). For example, when the details of parking of the vehicle which has started and the details of the parking reservation are different from each other in a parking place (a parking section) or a parking time (for example, the parking has started outside of the reserved parking time), the server 10 determines that the details of parking of the vehicle 30 which has started do not match the details of the parking reservation.

When it is determined in Step S108 that the parking does not match the details of the parking reservation (NO in Step S108), the server 10 notifies the mobile terminal 20 that the parking does not match the reservation details (Step S111), and the mobile terminal 20 presents the received notification to the user (S112). For example, one of Notification examples (1), (2), (4), and (5) is presented via the display unit 25. Thereafter, the process flow illustrated in FIG. 5 ends.

When it is determined in Step S108 that the parking matches the details of the parking reservation (YES in Step S108), the server 10 updates parking lot use information stored in the database 110 (Step S105). Specifically, the identification information of the parking section is identified as a parking position, the time at which the identification information is read is identified as a parking start time, and the user information of the mobile terminal 20 is identified as information of the user who has parked the vehicle. In this way, the parking lot use information is updated.

Thereafter, the server 10 notifies the mobile terminal 20 of the start of parking (Step S109). The mobile terminal 20 gives the notification to the user by displaying the notification (for example, Notification example (3)) on the display unit 25 or the like (Step S110), and the process flow illustrated in FIG. 5 ends.

As described above, according to the process flow illustrated in FIG. 5, the parking management system 1 can identify a difference between details of the registered reservation for the parking lot and the actual parking situation and can notify the user of the difference (that is, that the parking does not match the reservation details).

According to the process flow illustrated in FIG. 5, the parking management system 1 can identify information of the position of the parking lot (the parking section) in which the vehicle 30 is parked and the parking start time without installing a device with a high cost such as a camera in the parking lot to recognize a parked vehicle and can perform parking management using the information. That is, according to the embodiment, it is possible to manage parking of a vehicle at a lower cost.

An example of a process flow of determining end of parking of the vehicle 30 in a parking lot will be described below with reference to the flowchart illustrated in FIG. 6.

First, the mobile terminal 20 receives a parking end instruction from the user (Step S201), and starts the camera 26 (Step S202). The mobile terminal 20 images a two-dimensional code installed in the parking section in which the vehicle 30 has been parked in accordance with the instruction from the user (Step S203). For example, the user having an intension to end the parking of the vehicle 30 (leave the parking lot) which has been parked in (entered) the parking section 41 of the parking lot 40 operates the mobile terminal 20 and instructs the camera to image the two-dimensional code 41a installed in the parking section 41. The mobile terminal 20 reads the identification information of the parking section (the parking position information) from the image of the two-dimensional code taken in Step S203 (Step S204).

Thereafter, the parking end instruction along with the identification information of the parking section, the time at which the identification information is read, and the user information of the mobile terminal 20 is transmitted from the mobile terminal 20 to the server 10. The server 10 receives the parking end instruction from the mobile terminal 20 (Step S205). The server 10 determines whether the user information received along with the identification information of the parking section in Step S205 matches the user information stored in the database 110 in correlation with the identification information of the parking section as the parking lot use information (Step S206). That is, in Step S206, the server 10 determines whether the user information and the identification information of the parking section received along with the parking end instruction match the parking lot use information stored in the database 110.

When it is determined in Step S206 that the received information matches (corresponds to) the stored information (YES in Step S206), the server 10 updates the parking lot use information stored in the database 110 based on the information received in Step S205 (Step S207). Specifically, the identification information of the parking section is identified as a position at which the parking ends, the time at which the identification information is read is identified as the parking end time, and the user information of the mobile terminal 20 is identified as the information of the user who ends the parking. In this way, the parking lot use information is updated.

Thereafter, the server 10 determines whether the parking end time updated in Step S207 is within a reserved time (Step S208). When it is determined that the parking end time is within the reserved time (YES in Step S208), the server 10 notifies the mobile terminal 20 of the end of parking (Step S209). The mobile terminal 20 gives a notification to the user by displaying the notification on the display unit 25 or the like (Step S210), and the process flow illustrated in FIG. 6 ends. In Step S210, for example, Notification example (10) is presented via the display unit 25.

When it is determined in Step S208 that the parking end time is not within the reserved time (NO in Step S208), the server 10 notifies the mobile terminal 20 that the parking time exceeds the reserved time (Step S211). The mobile terminal 20 gives a notification to the user by displaying the notification on the display unit 25 or the like (Step S212), and the process flow illustrated in FIG. 6 ends. In Step S212, for example, Notification example (11) is presented via the display unit 25.

When it is determined in Step S206 that the received information does not match (correspond to) the stored information (NO in Step S206), the server 10 notifies the mobile terminal 20 of the determination result (Step S213). The mobile terminal 20 gives a notification to the user by displaying the notification on the display unit 25 or the like (Step S214), and the process flow returns to Step S201. In Step S214, for example, Notification example (12) is presented via the display unit 25.

As described above, according to the process flow illustrated in FIG. 6, the parking management system 1 can identify a difference between the details of the registered reservation for the parking lot and the actual parking situation (the parking end time) and notify the user of the difference (that is, that the parking does not match the reservation details).

According to the process flow illustrated in FIG. 6, the parking management system 1 can identify information of the position of the parking lot (the parking section) in which the vehicle 30 is parked and the parking end time without installing a device with a high cost such as a camera in the parking lot to recognize a parked vehicle and can implement parking management using the information.

Example 1.2

There may be a large difference between the parking start time or the parking end time identified in the process flow illustrated in FIG. 5 or 6 and the time at which the parking has been actually started or ended. For example, when the time at which the user has actually parked the vehicle is greatly different from the time at which the user has performed imaging in Step S105 of FIG. 5, the parking start time has a large error. When the time at which the user has actually ended the parking of the vehicle is greatly different from the time at which the user has performed imaging in Step S203 of FIG. 6, the parking end time has a large error. As a result, for example, when the parking fee is calculated based on the parking time which is identified by the parking start time and the parking end time, the parking fee may be greatly different from a parking fee corresponding to the actual parking time.

Therefore, an example of a process flow of performing parking management by more accurately identifying the parking start time and the parking end time of the vehicle 30 in the parking lot will be described below.

First, Parking start time identifying process a will be described as an example of a process flow of more accurately identifying the parking start time with reference to the flowchart illustrated in FIG. 7. This process flow is based on the premise that parking reservation information is registered in the database 110 of the server 10 in accordance with an instruction from the user of the mobile terminal 20. The same is true of process flows in flowcharts illustrated in the drawings which will be described later.

In Parking start time identifying process a, first, the mobile terminal 20 of the user who boards the vehicle 30 acquires its position information through a positioning process (Step S301) and determines whether a current position is in the vicinity (for example, within 30 m) of the parking lot reserved by the user of the mobile terminal 20 (Step S302). Information of the parking lot reserved by the user is acquired from the database 110 of the server 10 via the network N.

When it is determined that the current position is in the vicinity thereof (YES in Step S302), the mobile terminal 20 acquires information sensed by the sensor 27 (sensing information) (Step S303), and determines whether a moving state of the user identified based on the sensor information is "being onboard" (moving by vehicle) (Step S304). The method of identifying the user state based on the sensor information is the same as described above.

When it is determined that the moving state is a state other than "being onboard" (that is, the moving state in the time points of S301 and S302 was "being onboard" but has been changed to another state thereafter) (NO in Step S304), the mobile terminal 20 determines that the vehicle 30 is parking/stopping (Step S305). Thereafter, the mobile terminal 20 sets the time at which it is determined in Step S304 that "being onboard" has changed to another state as the parking start time (Step S306). Thereafter, Parking start time identifying process a illustrated in FIG. 7 ends.

Figure 7:
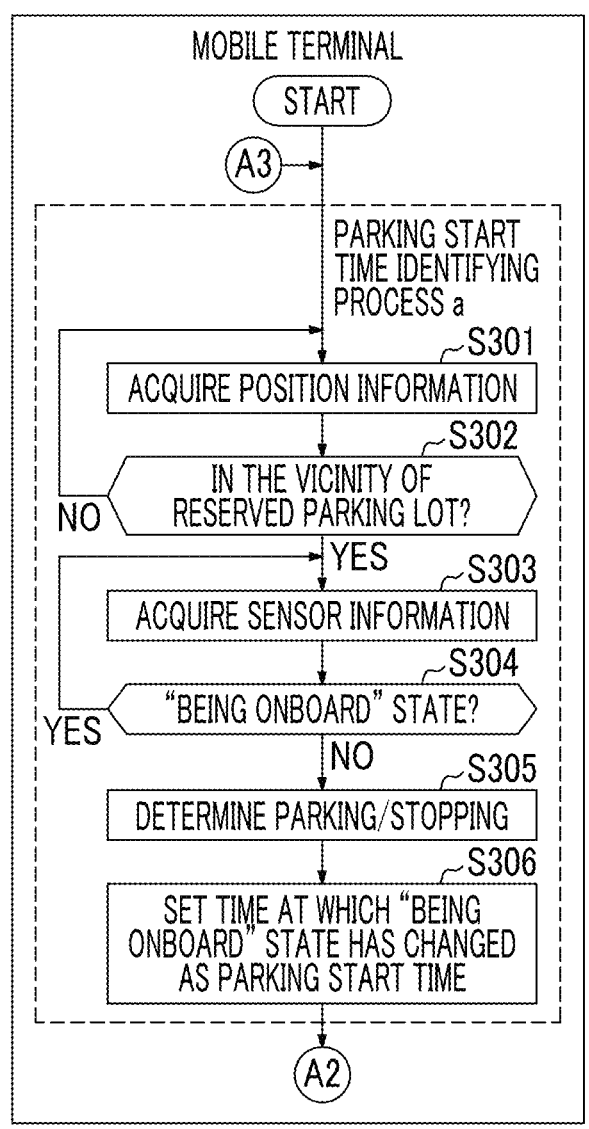
FIG. 7 is a diagram illustrating an example of a process flow in the parking management system according to the embodiment.

As described above, according to the process flow illustrated in FIG. 7, when the current position is in the vicinity of the parking lot reserved by the user of the mobile terminal 20, the mobile terminal 20 sets the time at which it is determined that "being onboard" has changed to another state based on the sensor information from the sensor 27 as the parking start time. As a result, it is possible to more accurately identify the parking start time.

An example of a process flow of starting parking of the vehicle 30 in a parking lot will be described below with reference to the flowchart illustrated in FIG. 8. This process flow starts, for example, after Parking start time identifying process a illustrated in FIG. 7 has been performed.

When designation of a parking position and a parking start instruction are received from the user (Step S401), the mobile terminal 20 starts the camera 26 (Step S402). The mobile terminal 20 images a two-dimensional code installed in a parking section in which the vehicle 30 has been parked in accordance with an instruction from the user (Step S403). For example, the user who has parked (enter) the vehicle 30 in the parking section 41 of the parking lot 40 operates the mobile terminal 20 and instructs imaging of the two-dimensional code 41a installed in the parking section 41. The mobile terminal 20 reads identification information of the parking section (parking position information) from the image of the two-dimensional code taken in Step S105 (Step S404).

Thereafter, a parking start instruction along with the identification information of the parking section, the time at which the identification information has been read, and the user information of the mobile terminal 20 is transmitted from the mobile terminal 20 to the server 10. The server 10 receives the parking start instruction from the mobile terminal 20 (Step S405).

The server 10 determines whether the details of parking of the vehicle 30 which has started matches details of the parking reservation based on the information received along with the instruction and the parking reservation information stored in the database 110 (Step S406). For example, when the details of parking of the vehicle 30 which has started and the details of the parking reservation are different from each other in a parking place (a parking section) or a parking time (for example, the parking has started out of the reserved parking time), the server 10 determines that the details of parking of the vehicle 30 which has started do not match the details of the parking reservation.

When it is determined in Step S406 that the parking does not match the details of the parking reservation (NO in Step S406), the server 10 notifies the mobile terminal 20 that the parking does not match the details of the parking reservation (Step S413) and the mobile terminal 20 presents the received notification to the user (S414). For example, one of Notification examples (1), (2), (4), and (5) is presented via the display unit 25. Thereafter, the process flow transitions to Step S301 in FIG. 7.

When it is determined in Step S406 that the parking matches the details of the parking reservation (YES in Step S406), the server 10 updates the parking lot use information stored in the database 110 (Step S407). Specifically, the identification information of the parking section is identified as the parking position, the time which is set as the parking start time in Step S306 in FIG. 7 is identified as the parking start time and the user information of the mobile terminal 20 is identified as information of the user who has parked the vehicle. In this way, the parking lot use information is updated (registered).

Thereafter, the server 10 determines whether the parking start time updated in Step S407 is before the reserved time (Step S408). When it is determined that the parking start time is not before the reserved time (NO in Step S408), the mobile terminal 20 notifies the server 10 of parking start (Step S409). The mobile terminal 20 gives a notification to the user by displaying the notification (for example, Notification example (3)) on the display unit 25 or the like (Step S410), and the process flow illustrated in FIG. 8 ends.

When it is determined in Step S408 that the parking start time is before the reserved time (YES in Step S408), the server 10 notifies the mobile terminal 20 that the parking start time is before the reserved time (Step S411). The mobile terminal 20 gives a notification to the user by displaying the notification (for example, Notification example (3a)) on the display unit 25 or the like (Step S412), and the process flow illustrated in FIG. 8 ends.

Figure 8:
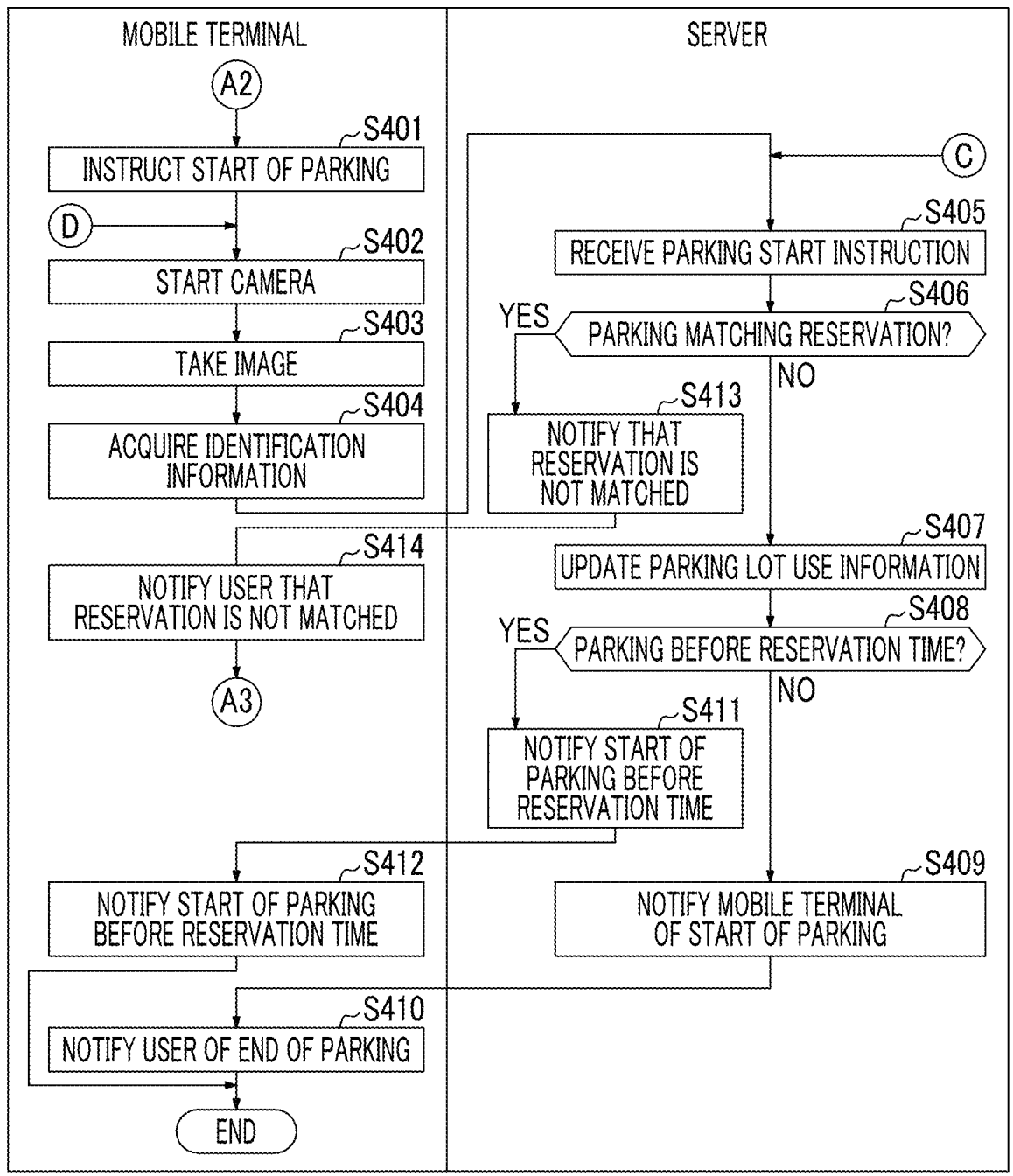
FIG. 8 is a diagram illustrating an example of a process flow in the parking management system according to the embodiment.

As described above, according to the process flow illustrated in FIG. 8, the parking management system 1 can identify a difference (that the parking has started before the reserved time) between the details of the registered reservation for the parking lot and the actual parking situation (the parking start time) and notify the user of the difference.

An example of a process flow of more accurately identifying the parking end time will be described below with reference to the flowchart illustrated in FIG. 9. The process flow illustrated in FIG. 9 starts when the determination result of Step S206 in the process flow illustrated in FIG. 6 is YES.

First, Parking end time identifying process a which described in Steps S501 to S506 is performed. In Parking end time identifying process a, the mobile terminal 20 of the user who approaches the vehicle 30 parked in a parking lot on foot acquires position information of the user through a positioning process (Step S501) and determines whether the current position is in the vicinity of the parking lot for which parking of the vehicle 30 has been reserved (for example, within 10 m) (Step S502). The information of the parking lot for which parking of the vehicle 30 has been reserved is acquired from the database 110 of the server 10 via the network N.

When it is determined that the current position is in the vicinity of the reserved parking lot (YES in Step S502), the mobile terminal 20 acquires sensor information from the sensor 27 (Step S503) and determines whether the identified moving state of the user is "being onboard" based on the sensor information (Step S504).

When it is determined that the moving state is "being onboard" (that is, the moving state was a state such as "walking" other than "being onboard" at the time point of Steps S501 and S502 and then changed to the "being onboard" state) (YES in Step S504), the mobile terminal 20 determines that the user is in the vehicle 30 (Step S505). Thereafter, the mobile terminal 20 sets the time at which the state is determined to change to "being onboard" in Step S504 as a parking end time of the vehicle 30 of the user of the mobile terminal 20 (Step S506). The information of the set parking end time is transmitted to the server 10.

After the server 10 receives the information of the parking end time from the mobile terminal 20 (Step S507), the server 10 updates the parking lot use information stored in the database 110 based on the information received in Step S507 and Step S205 in FIG. 6 (Step S508). Completely, the identification information of the parking section and the user information of the mobile terminal 20 which have been received in Step S205 are identified as information of the position at which the parking ends and the user who ends the parking and the parking end time received in Step S507 is identified as the parking end time. In this way, the parking lot use information is updated (registered).

Thereafter, the server 10 determines whether the parking end time registered in Step S508 is within the reserved time (Step S509). When it is determined that the parking end time is within the reserved time (YES in Step S509), the server 10 notifies the mobile terminal 20 of the end of parking (Step S510). The mobile terminal 20 gives a notification to the user by displaying the notification on the display unit 25 or the like (Step S511), and the process flow illustrated in FIG. 9 ends. In Step S511, for example, Notification example (10) is presented via the display unit 25.

When it is determined in Step S509 that the parking end time is not within the reserved time (NO in Step S509), the server 10 notifies the mobile terminal 20 that the parking time exceeds the reserved time (Step S512). The mobile terminal 20 gives a notification to the user by displaying the notification on the display unit 25 or the like (Step S513), and the process flow illustrated in FIG. 9 ends. In Step S513, for example, Notification example (11) is presented via the display unit 25.

Figure 9:
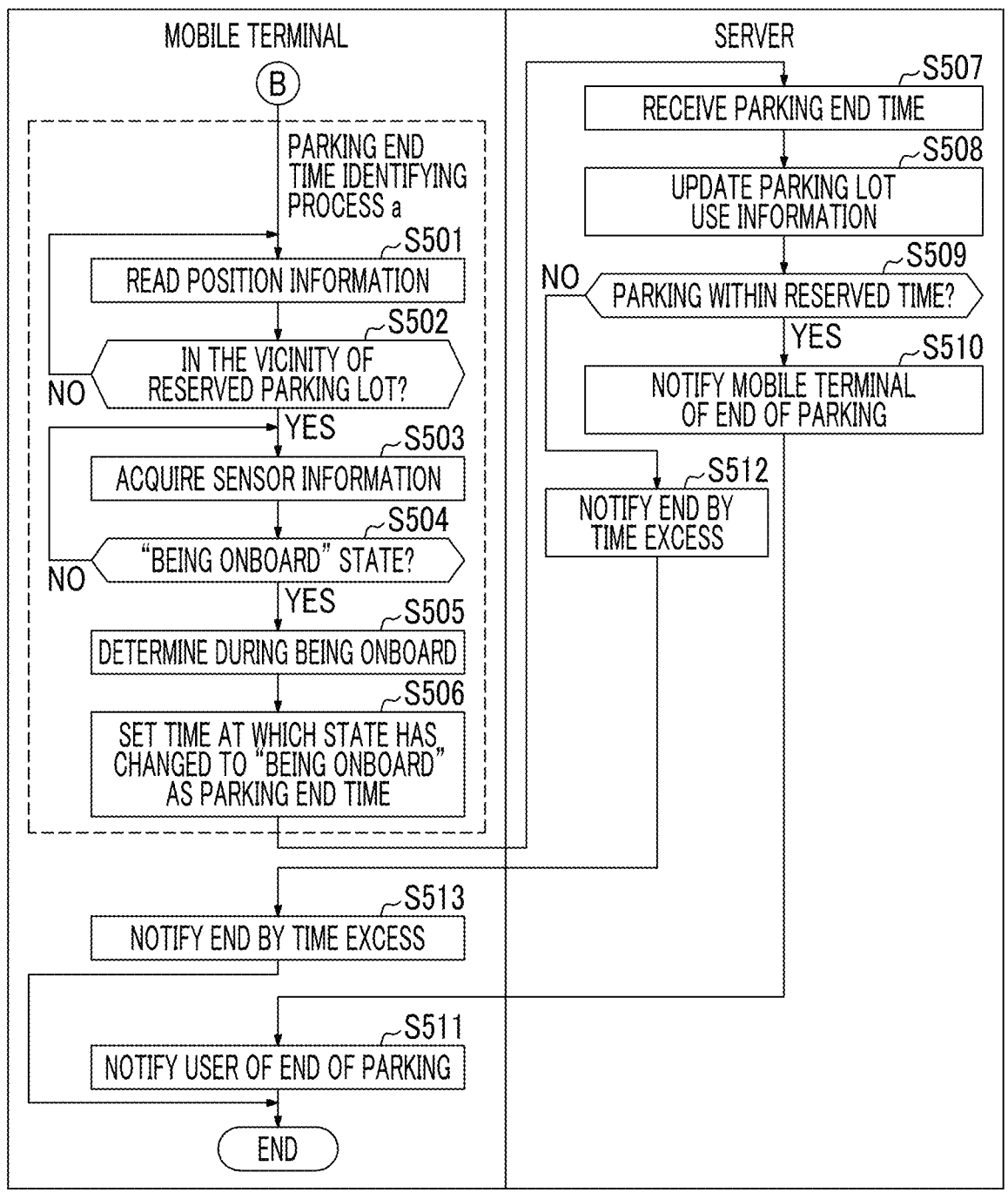
FIG. 9 is a diagram illustrating an example of a process flow in the parking management system according to the embodiment.

As described above, according to the process flow illustrated in FIG. 9, the parking management system 1 can identify a difference between the details of the registered reservation for the parking lot and the actual parking situation (the parking end time) and notify the user of the difference (that is, that the parking does not match the reservation details).

According to the process flow illustrated in FIG. 9, when the current position is in the vicinity of the parking lot in which the vehicle has been parked, the mobile terminal 20 sets the time at which another state is determined to change to "being onboard" based on the sensor information from the sensor 27 as the parking end time. As a result, it is possible to more accurately identify the parking end time.

Example 1.3

In the process flows illustrated in FIGS. 5 and 6, when the system automatically reads identification information of a parking section from an image of a two-dimensional code and the camera 26 is started at a time earlier than necessary, the mobile terminal 20 may perform a meaningless process or erroneously recognition of identification information. An example of a process flow for reducing execution of a meaningless process of the mobile terminal 20 and erroneous recognition of identification information will be described below with reference to FIGS. 10 and 11. In the process flows, the mobile terminal 20 is fixed and installed on an instrument panel of the vehicle 30 and cameras are provided on the front surface and the rear surface of the mobile terminal 20. In this state, the cameras installed on both surfaces of the mobile terminal 20 can image the front side or the rear side of the vehicle 30.

First, a process of starting parking in a parking lot will be described with reference to FIG. 10. The mobile terminal 20 performs Parking start time identifying process a (Step S601). Parking start time identifying process a is the same as described with reference to FIG. 7 and is a process capable of more accurately identifying a parking start time (a time of start of parking).

The mobile terminal 20 automatically starts the camera 26 at a time after Parking start time identifying process a has been performed (Step S602), and takes an image in a viewing angle of the camera 26 (Step S603). In this way, since the camera 26 is started after the parking start time has been more accurately identified in Step S501, it is possible to reduce a meaningless process by the camera 26 of the mobile terminal 20.

Thereafter, the mobile terminal 20 determines whether a two-dimensional code is included in the image taken in Step S603 and identification information of a parking section is readable from the image of the two-dimensional code (Step S604). When it is determined that identification information is readable (YES in Step S604), the mobile terminal 20 reads the identification information and the process flow transitions to Step S405 in FIG. 8. That is, the mobile terminal 20 automatically reads identification information of a parking section from the two-dimensional code after the start of parking has been determined in the processes of Steps S601 to S604.

When it is determined in Step S604 that the identification information is not readable (NO in Step S604), the mobile terminal 20 tries to read the identification information of the parking section from an image of a two-dimensional code (Step S606) by changing an imaging direction of the camera 26 (Step S605) and then taking an image. Here, changing of the imaging direction of the camera 26 means, for example, that imaging of the front side of the vehicle 30 using the camera installed on the front surface of the mobile terminal 20 has changed to imaging of the rear side of the vehicle 30 using the camera installed on the rear surface of the mobile terminal 20. When the identification information is readable (YES in Step S607), the process flow transitions to Step S405 in FIG. 8. When the identification information is not readable (NO in Step S607), the mobile terminal 20 displays a parking start button for receiving a parking start instruction from the user on the display unit 25 (Step S608) and receives the parking start instruction, and then the process flow transitions to Step S401 in FIG. 8. That is, when it is determined in Step S607 that the identification information of the parking section is not automatically readable, the processes of Steps S401 to S404 in FIG. 8 are performed.

Figure 10:
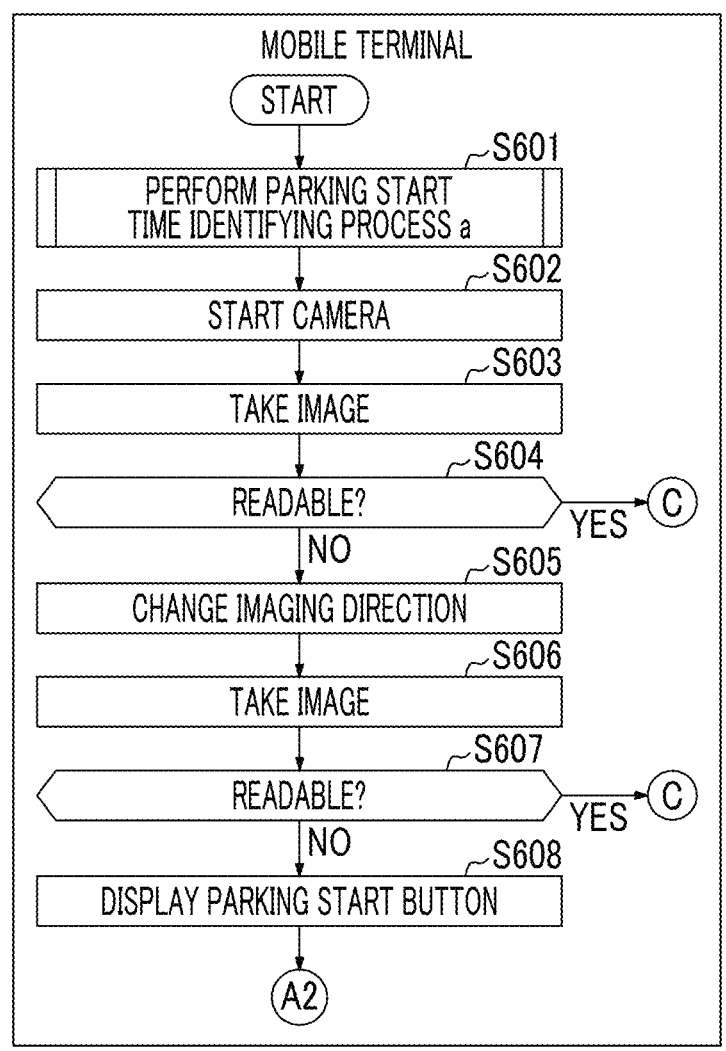
FIG. 10 is a diagram illustrating an example of a process flow in the parking management system according to the embodiment.

As described above, according to the process flow illustrated in FIG. 10, since the camera 26 is started after the parking start time has been more accurately identified, it is possible to reduce a meaningless process by the camera 26 of the mobile terminal 20. It is also possible to reduce erroneous recognition of the identification information by performing imaging at an unnecessary time.

An example of a process flow for reducing execution of a meaningless process of the mobile terminal 20 and erroneous recognition of identification information at the time of end of parking will be described below with reference to FIG. 11.

The mobile terminal 20 performs Parking end time identifying process a (Step S701). Parking end time identifying process a is the same process as described with reference to FIG. 9 and is a process capable of more accurately identifying a parking end time of the vehicle 30 without using an image taken by the camera 26.

Thereafter, the server 10 receives a parking end instruction along with information of the parking end time of the vehicle 30 from the mobile terminal 20 (Step S702) and updates the parking lot use information stored in the database 110 to reflect the information of the end of parking based on the received information (Step S703).

Thereafter, the server 10 determines whether the parking end time updated in Step S703 is within the reserved time (Step S704). When it is determined that the parking end time is within the reserved time (YES in Step S704), the server 10 notifies the mobile terminal 20 of the end of parking (Step S705). The mobile terminal 20 gives a notification to the user by displaying the notification on the display unit 25 or the like (Step S706), and the process flow illustrated in FIG. 11 ends. In Step S706, for example, Notification example (10) is presented via the display unit 25.

When it is determined in Step S704 that the parking end time is not within the reserved time (NO in Step S704), the server 10 notifies the mobile terminal 20 that the parking time exceeds the reserved time (Step S707). The mobile terminal 20 gives a notification to the user by displaying the notification on the display unit 25 or the like (Step S708), and the process flow illustrated in FIG. 11 ends. In Step S708, for example, Notification example (11) is presented via the display unit 25.

Figure 11:
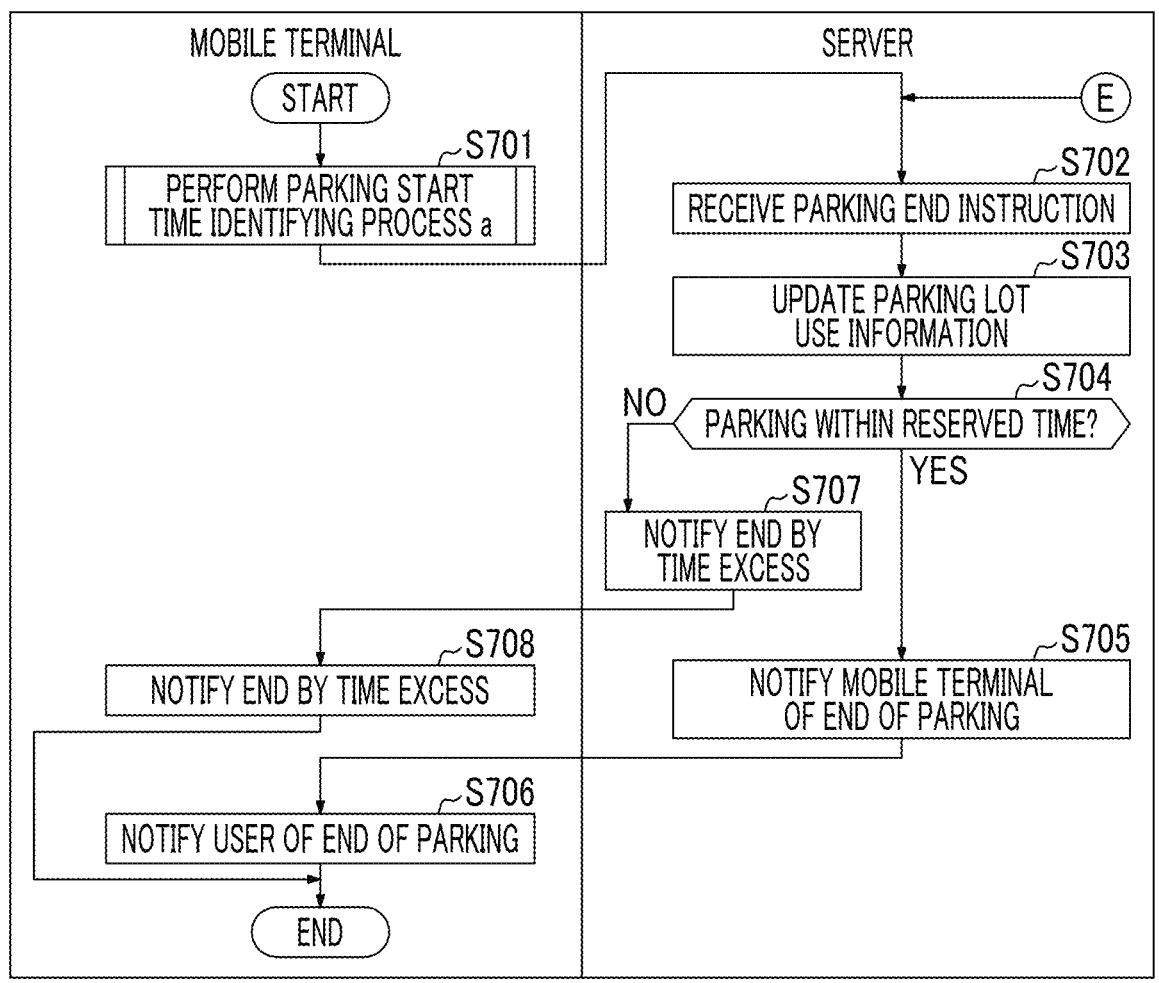
FIG. 11 is a diagram illustrating an example of a process flow in the parking management system according to the embodiment.

As described above, according to the process flow illustrated in FIG. 11, the parking management system 1 can identify a difference between the details of the registered reservation for the parking lot and the actual parking situation (the parking end time) and notify the user of the difference (that is, that the parking does not match the reservation details).

According to the process flow illustrated in FIG. 11, since the parking end time of the vehicle 30 is identified without using an image taken by the camera 26, it is possible to reduce a meaningless process by the camera 26 of the mobile terminal 20 and to reduce occurrence of erroneous recognition of the identification information.

Example 1.4

When identification information of a parking section is read from an image taken with the camera 26, the user does not image a two-dimensional code with the camera 26 or the camera 26 cannot automatically image the two-dimensional code, whereby identification information is not readable. A process flow for reducing occurrence of such an event will be described below with reference to FIGS. 12 and 13.

A parking starting process will be described below with reference to FIG. 12. First, the mobile terminal 20 performs Parking start time identifying process a (Step S801). Parking start time identifying process a is the same process as described with reference to FIG. 7. Thereafter, the mobile terminal 20 determines whether a predetermined time (for example, 3 minutes) has elapsed (Step S802). When the predetermined time has elapsed, the mobile terminal 20 determines whether a parking start instruction has received from the user (Step S803), and the process flow transitions to Step S402 in FIG. 8 when the parking start instruction has been received (YES in Step S803). When the parking start instruction has not been received (NO in Step S803), the mobile terminal 20 gives a notification for promoting an instruction to start parking to the user (Step S804) and then the process flow transitions to Step S802. The notification for promoting an instruction is performed, for example, by displaying a message on the display unit 25 of the mobile terminal 20 or outputting speech from the mobile terminal 20.

Figure 12:
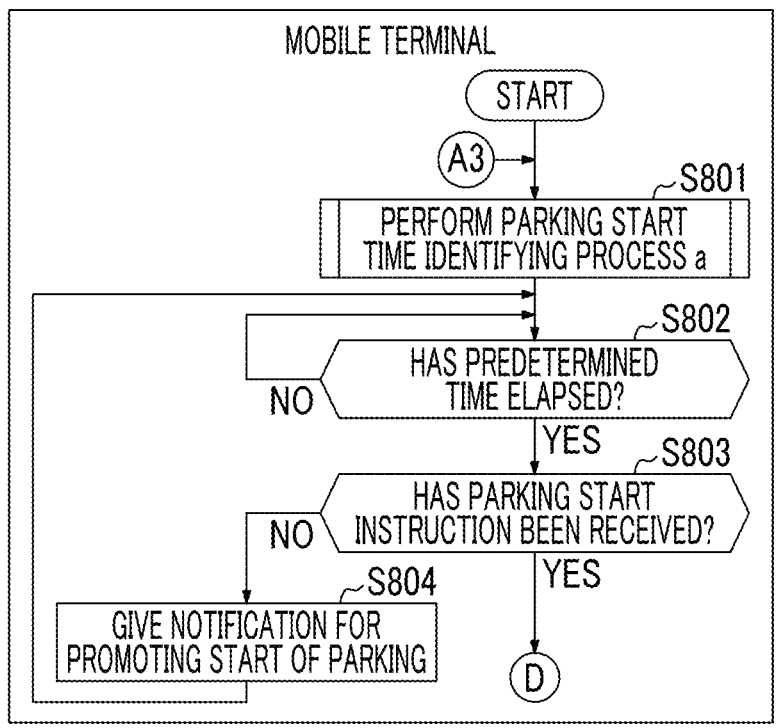
FIG. 12 is a diagram illustrating an example of a process flow in the parking management system according to the embodiment.

As described above, according to the process flow illustrated in FIG. 12, when a parking start instruction has not been received from the user even if a predetermined time has elapsed after the parking start time has been identified, the mobile terminal 20 gives a notification for promoting an instruction to start parking to the user. Accordingly, it is possible to reduce occurrence of an event in which parking of the vehicle 30 has been started but the identification information of the parking section has not been read.

A parking ending process will be described below with reference to FIG. 13. First, the mobile terminal 20 performs Parking end time identifying process a (Step S901). Parking end time identifying process a is the same process as described with reference to FIG. 9. Thereafter, the mobile terminal 20 determines whether a predetermined time (for example, 3 minutes) has elapsed (Step S902). When the predetermined time has elapsed, the mobile terminal 20 determines whether a parking end instruction has been received from the user (Step S903), and the process flow transitions to Step S702 in FIG. 11 when the parking end instruction has been received. When the parking end instruction has not been received, the mobile terminal 20 gives a notification for promoting an instruction to end parking to the user (Step S904), and the process flow transitions to Step S902. The notification for promoting an instruction is performed, for example, by displaying a message on the display unit 25 of the mobile terminal 20 or outputting speech from the mobile terminal 20.

Figure 13:
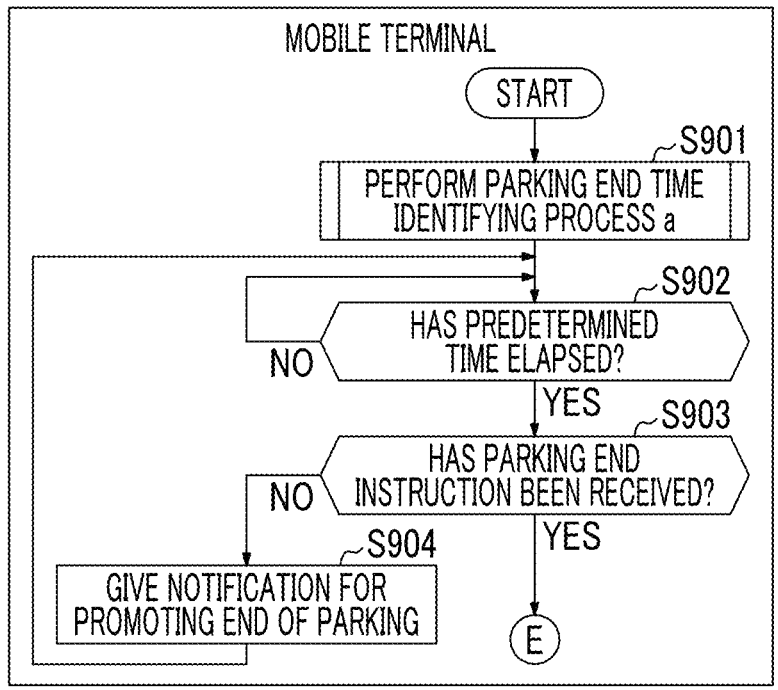
FIG. 13 is a diagram illustrating an example of a process flow in the parking management system according to the embodiment.

As described above, according to the process flow illustrated in FIG. 13, when a parking end instruction has not been received from the user even if a predetermined time has elapsed after the parking end time has been identified, the mobile terminal 20 gives a notification for promoting an instruction to end parking to the user. Accordingly, it is possible to reduce occurrence of an event in which parking of the vehicle 30 has been ended but the identification information of the parking section has not been read.

3.2 Example 2

Example 2 is an example in which parking management is performed by processing of the server 10, the mobile terminal 20, and the vehicle 30 in the configuration of the parking management system 1 illustrated in FIG. 1.

Example 2.1

An example of a process flow of determining start and end of parking of the vehicle 30 in a parking lot will be described below with reference to the flowcharts illustrated in FIGS. 14 and 15.

First, Parking start time identifying process b will be described as an example of a process of determining start of parking of the vehicle 30 in a parking lot with reference to FIG. 14.

First, the mobile terminal 20 receives data including position information of the vehicle 30 and a vehicle signal from an on-board terminal of the vehicle 30 (Step S1001). The on-board terminal is included in the vehicle 30 and has, for example, the same configuration as the mobile terminal 20 described above and another configuration. The position information of the vehicle 30 is identified by a positioning function of the vehicle 30. The vehicle signal includes, for example, an AT (automatic) shift signal, a vehicle speed signal, an IG (ignition) signal, and/or an ACC signal (an accessory signal).

Then, the mobile terminal 20 reads the position information of the vehicle 30 from the data received in Step S1001 (Step S1002) and determines whether the current position of the vehicle 30 is in the vicinity (for example, within 10 m) of a parking lot which has been reserved by the user of the mobile terminal 20 (Step S1003). Information of the parking lot which has been reserved by the user is acquired from the database 110 of the server 10 via the network N.

When the current position is in the vicinity of the parking lot (YES in Step S1003), the mobile terminal 20 reads the vehicle signal from the data received in Step S1001 (Step S1004) and determines whether the AT shift signal indicates P (parking) (Step S1005). When the AT shift signal indicates parking (YES in Step S1005), the mobile terminal 20 determines that the vehicle 30 is being parked/stopped in the parking lot (Step S1006).

When the vehicle signal read in Step S1004 includes the AT shift signal, the IG signal, or the vehicle speed signal, it is determined in Step S1005 whether the AT shift signal indicates P (parking), whether the IG signal indicates OFF, or whether the vehicle speed signal indicates zero. When the determination result is YES, it is determined in Step S1006 that the vehicle 30 is being parked/stopped in the parking lot.

Thereafter, the mobile terminal 20 sets the time at which YES has been determined in Step S1005 as the parking start time in the parking lot (Step S1007).

Parking start time identifying process b ends and then the process flow transitions to Step S401 in FIG. 8.

Figure 14:
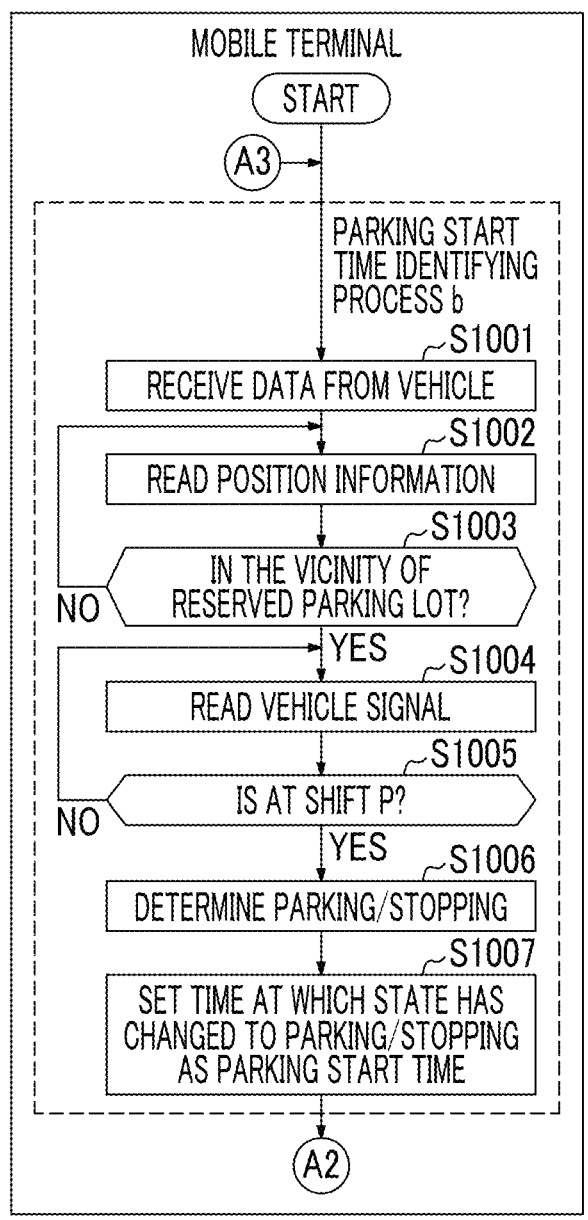
FIG. 14 is a diagram illustrating an example of a process flow in the parking management system according to the embodiment.

As described above, according to the process flow illustrated in FIG. 14, the parking management system 1 can identify information of a position of a parking lot (a parking section) in which the vehicle 30 has been parked and the parking start time without installing a high-cost device such as a camera in the parking lot to recognize parked vehicle. As a result, it is possible to implement parking management at a low cost using the information.

According to the process flow illustrated in FIG. 14, the parking start time in the parking lot is identified using the vehicle signal transmitted from the vehicle 30. Vehicle signals such as the AT (automatic) shift signal, the vehicle speed signal, the IG (ignition) signal, and the ACC signal (accessory signal) are automatically transmitted depending on the vehicle state. Accordingly, according to the process flow illustrated in FIG. 14, it is possible to more accurately identify the parking start time in comparison with a case in which the user manually designates the parking start time.

An example of a process flow of determining end of parking of the vehicle 30 in a parking lot will be described below with reference to the flowchart illustrated in FIG. 15. The process flow illustrated in FIG. 15 starts when the determination result of Step S206 in the process flow illustrated in FIG. 6 is YES.

First, the mobile terminal 20 performs Parking end time identifying process b (Steps S1101 to S1107). In Parking end time identifying process b, first, the mobile terminal 20 receives data including position information of the vehicle 30 and a vehicle signal from the on-board terminal of the vehicle 30 (Step S1101). The position information of the vehicle 30 is identified by the positioning function of the vehicle 30. The vehicle signal includes, for example, a vehicle speed signal.

Then, the mobile terminal 20 reads the position information of the vehicle 30 from the data received in Step S1001 (Step S1102), and determines whether the current position of the vehicle 30 is in the vicinity (for example, within 10 m) of a parking lot in which the vehicle has been parked (reserved) (Step S1103). The information of the parking lot in which the vehicle 30 has been parked is acquired from the database 110 of the server 10 via the network N.

When it is determined that the current position is in the vicinity of the parking lot (YES in Step S1103), the mobile terminal 20 reads the vehicle signal from the data received in Step S1001 (Step S1104) and determines whether the value of a vehicle speed is greater than 0 km (Step S1105). When the vehicle speed is greater than 0 km (YES in Step S1105), the mobile terminal 20 determines that the vehicle 30 is moving (Step S1106). When a moving distance of the vehicle is measured by integrating wheel speed pulses and the measured moving distance is greater than a predetermined value (for example, 20 m or more), it may be determined that parking has ended.

The method of determining whether the vehicle 30 is moving may employ any method without using a vehicle speed. For example, when a change value of the position of the vehicle 30 indicated by the data received from the vehicle 30 within a predetermined period is equal to or greater than a predetermined value, it may be determined that the vehicle 30 is moving.

Thereafter, the mobile terminal 20 sets the time at which it is determined in Step S1106 that the vehicle is moving as the parking end time (Step S1107).

Parking end time identifying process b ends, and then the server 10 receives a parking end instruction of the vehicle 30 along with the parking end time, the identification information of the parking section, and the user information from the mobile terminal 20 (Step S1108). The server 10 updates the parking lot use information stored in the database 110 to reflect the information of the end of parking of the vehicle 30 based on the information received in Step S1108 and Step S205 in FIG. 6 (Step S1109).

Thereafter, the server 10 determines whether the parking end time updated in Step S1109 is within the reserved time (Step S1110). When it is determined that the parking end time is within the reserved time (YES in Step S1110), the server 10 notifies the mobile terminal 20 that parking has ended (Step S1111). The mobile terminal 20 gives a notification to the user by displaying the notification on the display unit 25 or the like (Step S1112), and the process flow illustrated in FIG. 15 ends. In Step S1112, for example, Notification example (10) is presented via the display unit 25.

When it is determined in Step S1110 that the parking end time is not within the reserved time (NO in Step S1110), the server 10 notifies the mobile terminal 20 that the parking time has exceeded the reserved time (Step S1113). The mobile terminal 20 gives a notification to the user by displaying the notification on the display unit 25 or the like (Step S1114), and the process flow illustrated in FIG. 15 ends. In Step S1114, for example, Notification example (11) is presented via the display unit 25.

Figure 15:
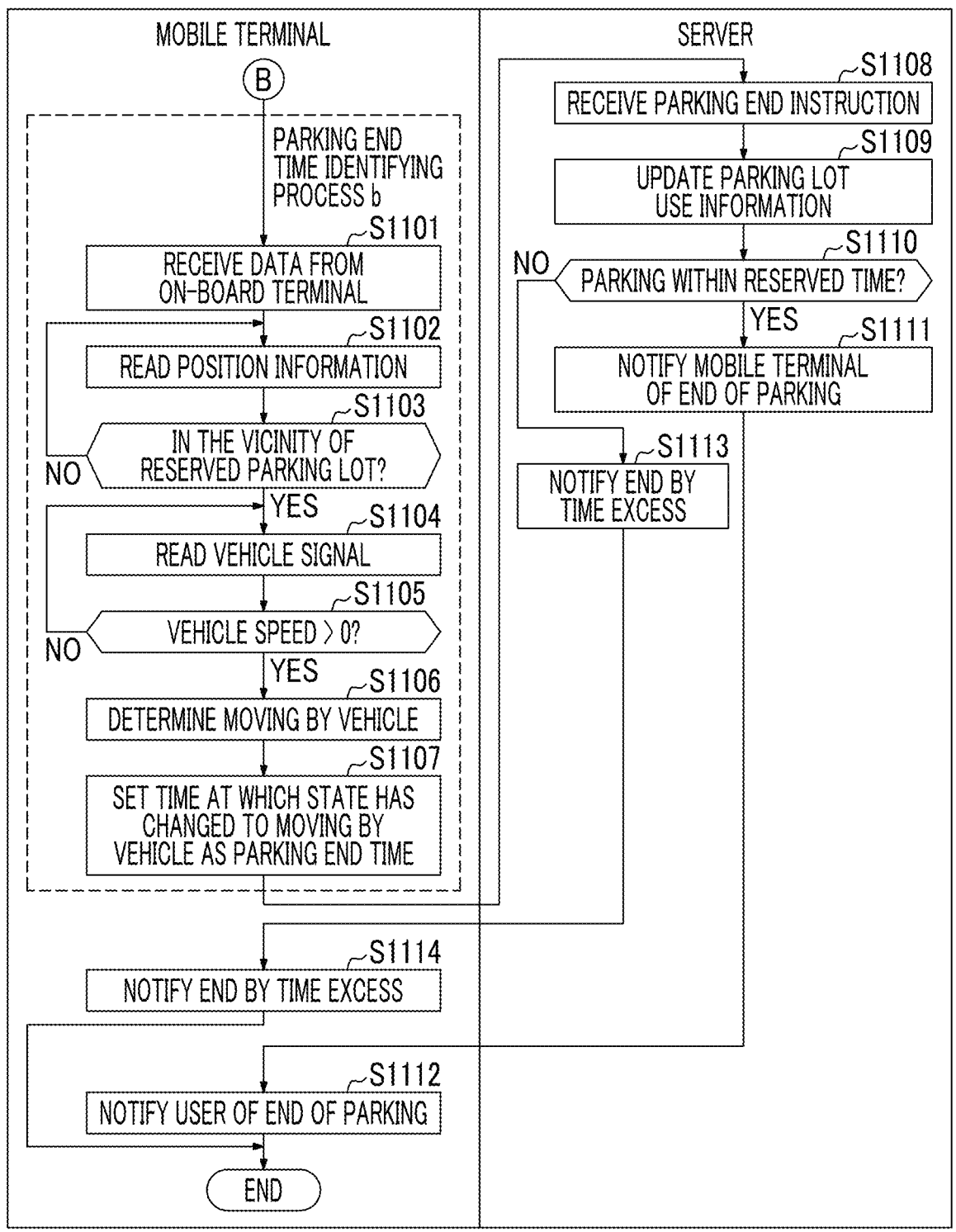
FIG. 15 is a diagram illustrating an example of a process flow in the parking management system according to the embodiment.

As described above, according to the process flow illustrated in FIG. 15, the parking management system 1 can identify a difference between the details of the registered reservation for the parking lot and the actual parking situation (the parking end time) and notify the user of the difference (that is, that the parking does not match the reservation details).

According to the process flow illustrated in FIG. 15, the parking management system 1 can identify information of a position of a parking lot (a parking section) in which the vehicle 30 has been parked and the parking end time without installing a high-cost device such as a camera in the parking lot to recognize parked vehicle. As a result, it is possible to implement parking management at a low cost using the information.

According to the process flow illustrated in FIG. 15, the parking end time in the parking lot is identified using the vehicle signal and/or the position information transmitted from the vehicle 30. Details of the vehicle signal and the position information are changed depending on the vehicle state. Accordingly, according to the process flow illustrated in FIG. 15, it is possible to more accurately identify the parking end time in comparison with a case in which the user manually designates the parking end time.

In the process flows illustrated in FIGS. 14 and 15, the mobile terminal 20 performs the processes of identifying the parking start time and the parking end time based on data received from the vehicle 30. As a modified example, the server 10 may perform the processes of identifying the parking start time and the parking end time based on the data received from the vehicle 30. Process flows in such a modified example are illustrated in FIGS. 16 and 17.

Figure 16:
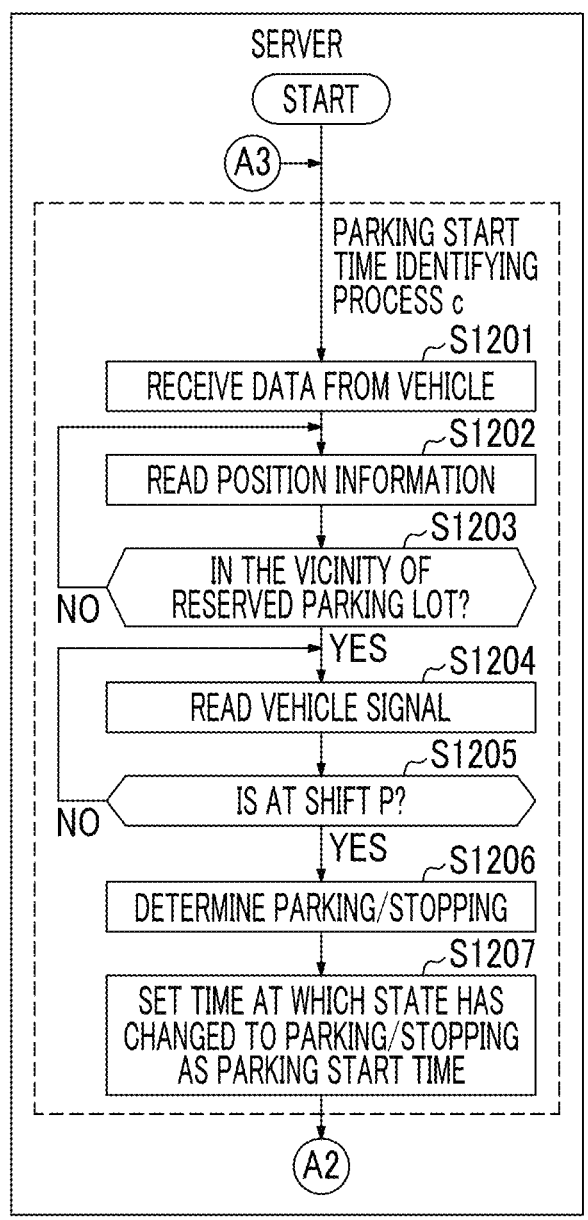
FIG. 16 is a diagram illustrating an example of a process flow in the parking management system according to the embodiment.

FIG. 16 illustrates Parking start time identifying process c as an example of the process flow in which the server 10 determines start of parking of the vehicle 30 in a parking lot based on data received from the vehicle 30. The processes of Steps S1201 to S1207 in Parking start time identifying process c are the same as Steps S1001 to S1007 illustrated in FIG. 14 and performed by the mobile terminal 20 and thus description thereof will not be repeated.

FIG. 17 illustrates Parking end time identifying process c as an example of the process flow in which the server 10 determines end of parking of the vehicle 30 in a parking lot based on data received from the vehicle 30. The processes of Steps S1301 to S1307 in Parking end time identifying process c are the same as Steps S1101 to S1107 illustrated in FIG. 15 and performed by the mobile terminal 20 and thus description thereof will not be repeated.

Example 2.2

In the processes of Example 2.1 (see FIGS. 5, 6, 14, and 15), for example, when identification information of a parking section is read from an image of a two-dimensional code and the camera 26 is started earlier than necessary, the mobile terminal 20 may perform a meaningless process or erroneously recognition of identification information. An example of a process flow for reducing execution of a meaningless process and erroneous recognition of identification information in the mobile terminal 20 will be described below.

A parking starting process in a parking lot in Example 2.2 is implemented by performing a process flow in which Parking start time identifying process a of Step S601 in the process flow illustrated in FIG. 10 is replaced with Parking start time identifying process b illustrated in FIG. 14 or Parking start time identifying process c illustrated in FIG. 16. Specific process details are combinations of the above-mentioned processes and thus description thereof will not be repeated.

The parking ending process in a parking lot in Example 2.2 is implemented by performing a process flow in which Parking end time identifying process a of Step S701 in the process flow illustrated in FIG. 11 is replaced with Parking end time identifying process b illustrated in FIG. 15 or Parking end time identifying process c illustrated in FIG. 17. Specific process details are combinations of the above-mentioned processes and thus description thereof will not be repeated.

According to the parking starting process in Example 2.2, since the camera 26 is started after the parking start time has been more accurately identified, it is possible to reduce a meaningless process by the camera 26 of the mobile terminal 20. It is also possible to reduce erroneous recognition of identification information due to imaging at an unnecessary time. According to the parking ending process in Example 2.2, since the parking end time of the vehicle 30 is identified without using an image taken with the camera 26, it is possible to reduce a meaningless process by the camera 26 of the mobile terminal 20 and to reduce occurrence of erroneous recognition of identification information.

Example 2.3

In the process flow of Example 2.1, when identification information of a parking section is read from an image taken with the camera 26, the identification information cannot be read because the user does not image a two-dimensional code with the camera 26 or the camera 26 cannot automatically image the two-dimensional code. An example of a process flow for reducing occurrence of such an event will be described below.

The parking starting process in a parking lot in Example 2.3 is implemented by performing a process flow in which Parking start time identifying process a of Step S801 in the process flow illustrated in FIG. 12 is replaced with Parking start time identifying process b illustrated in FIG. 14 or Parking start time identifying process c illustrated in FIG. 16. Specific process details are combinations of the above-mentioned processes and thus description thereof will not be repeated.

The parking ending process in a parking lot in Example 2.3 is implemented by performing a process flow in which Parking end time identifying process a of Step S901 in the process flow illustrated in FIG. 13 is replaced with Parking end time identifying process b illustrated in FIG. 15 or Parking end time identifying process c illustrated in FIG. 17. Specific process details are combinations of the above-mentioned processes and thus description thereof will not be repeated.

According to the parking starting process of Example 2.3, when a parking start instruction has not been received from the user even if a predetermined time has elapsed after the parking start time has been identified, the mobile terminal 20 gives a notification for promoting an instruction to start parking to the user. Accordingly, it is possible to reduce occurrence of an event in which parking of the vehicle 30 has been started but identification information of a parking section is not read. According to the parking ending process of Example 2.3, when a parking end instruction has not been received from the user even if a predetermined time has elapsed after the parking end time has been identified, the mobile terminal 20 gives a notification for promoting an instruction to start parking to the user. Accordingly, it is possible to reduce occurrence of an event in which parking of the vehicle 30 has been ended but identification information of a parking section is not read.

3.3 Example 3

Example 3 is an example in which parking management is performed by processing of the server 10 and the vehicle 30 in the configuration of the parking management system 1 illustrated in FIG. 1.

A process flow according to Example 3 is implemented by causing the vehicle 30 to perform the process flow which is performed by the mobile terminal 20 in the process flow described in Example 1.3. At this time, the vehicle 30 has the same configuration as the mobile terminal 20.

According to a parking starting process in Example 3, similarly to Example 1.3, since the camera mounted in the vehicle 30 is automatically started to take an image after the parking start time has been more accurately identified, it is possible to reduce a meaningless process by the camera. In addition, it is possible to reduce erroneous recognition of identification information due to imaging at an unnecessary time. According to a parking ending process in Example 3, since the parking end time of the vehicle 30 is identified without using an image taken by the camera of the vehicle 30, it is possible to reduce a meaningless process by the camera and to reduce occurrence of erroneous recognition of identification information.

3.4 Other Examples

While embodiments of the disclosure have been described above with reference to the accompanying drawings, the scope of the disclosure is not limited to the embodiments. Those skilled in the art can make various modified examples or corrections within the range of the concept described in the appended claims, and such examples are also included in the technical scope of the disclosure.

A program capable of performing the processes described in the above-mentioned embodiments can be identified as the disclosure. The program according to the disclosure can be stored in various recording mediums such as an optical disc such as a CD-ROM, a magnetic disk, and a semiconductor memory. The program can be installed or loaded in a computer by downloading the program from the recording mediums or via a communication network or the like.

What is claimed is:

1. A parking management system comprising:
   a mobile terminal including at least one sensor and a first control unit which comprises a first CPU and a first memory,
   a server including a second control unit which comprises a second CPU and a second memory, and
   a vehicle including an on-board terminal which comprises a third CPU and a third memory, wherein the vehicle is configured to be driven by a user of the mobile terminal;
the on-board terminal is configured to transmit a vehicle signal to the mobile terminal; and
the first control unit is configured to
store user information,
read identification information of a parking section from a code correlated with the parking section,
identify a position of the mobile terminal,
identify parking time information including a parking start time or a parking end time of the vehicle based on the vehicle signal received from the on-board terminal when the user drives the vehicle to enter the parking section and the at least one sensor detects that a state of the user is changed between an onboard state and a non-onboard state, and
transmit parking information and parking reservation information to the server, the parking information includes the user information, the identification information, and the parking time information and the parking reservation information is information of a parking reservation request for a parking lot; and
the second control unit is configured to
store the parking reservation information for the parking section,
receive the parking information from the mobile terminal, and
determine whether parking of the vehicle in the parking section matches reservation details based on the parking reservation information and the parking information, wherein
when a parking start instruction has not been received from the user for more than a predetermined time after the parking start time has been identified, the first control unit is further configured to give a notification for promoting an instruction to start parking to the user, and
when a parking end instruction has not been received from the user for more than a predetermined time after the parking end time has been identified, the first control unit is further configured to give another notification for promoting another instruction to end parking to the user.

2. The parking management system according to claim 1, wherein the second control unit is configured to
calculate a parking fee for the parking section using the parking information; and
notify the mobile terminal of the parking fee.

3. The parking management system according to claim 1, wherein the second control unit is further configured to notify the mobile terminal when determining that the parking in the parking section does not match the reservation details.

4. The parking management system according to claim 1, wherein the first control unit is further configured to identify the parking start time or the parking end time based on a reading result.

5. The parking management system according to claim 1, wherein the first control unit is further configured to identify the parking start time or the parking end time based on a time at which the identification information is read.

6. The parking management system according to claim 1, wherein
the code is further correlated to time information,
the first control unit is further configured to identify the parking start time or the parking end time based on the time information read.

7. The parking management system according to claim 1, wherein the first control unit is further configured to:
detect a start of parking or an end of parking based on a detection result by the at least one sensor; and
identify the parking start time or the parking end time based on a time at which the start of parking or the end of parking is detected.

8. The parking management system according to claim 1, wherein the first control unit is further configured to identify the parking start time or the parking end time based on the vehicle signal received from the vehicle.

9. The parking management system according to claim 1, wherein the first control unit is further configured to:
detect a start of parking or an end of parking based on the vehicle signal from the vehicle; and
identify the parking start time or the parking end time based on a time at which the start of parking or the end of parking is detected.

10. The parking management system according to claim 1, wherein the code is a two-dimensional code image.

11. A parking management method comprising:
storing user information using a mobile terminal, a user of the mobile terminal drives a vehicle;
reading identification information of a parking section from a code correlated with the parking section using the mobile terminal;
identifying a position of the mobile terminal;
transmitting a vehicle signal to the mobile terminal from an on-board terminal of the vehicle;
identifying parking time information including a parking start time or a parking end time of the vehicle based on the vehicle signal received from the on-board terminal when the user drives the vehicle to enter the parking section and at least one sensor mounted on the mobile terminal detects that a state of the user is changed between an onboard state and a non-onboard state;
transmitting parking information and parking reservation information to a server using the mobile terminal, the parking information includes the user information, the identification information, and the parking time information and the parking reservation information is information of a parking reservation request for a parking lot;
storing the parking reservation information for the parking section using the server;
receiving the parking information from the mobile terminal using the server; and
determining whether parking of a vehicle in the parking section matches reservation details based on the parking reservation information and the parking information using the server, wherein
when a parking start instruction has not been received from the user for more than a predetermined time after the parking start time has been identified, the mobile terminal gives a notification for promoting an instruction to start parking to the user, and
when a parking end instruction has not been received from the user for more than a predetermined time after the parking end time has been identified, the mobile terminal gives another notification for promoting another instruction to end parking to the user.

12. A parking management system comprising:
a mobile terminal including at least one sensor and a first control unit which comprises a first CPU and a first memory,
a server including a second control unit which comprises a second CPU and a second memory, and a vehicle including an on-board terminal which comprises a third CPU and a third memory, wherein
the vehicle is configured to be driven by a user of the mobile terminal;
the on-board terminal is configured to transmit a vehicle signal to the mobile terminal; and
the first control unit is programmed to
store user information,
read identification information of a parking section from a code correlated with the parking section,
identify a position of the mobile terminal;
identify parking time information including a parking start time or a parking end time of the vehicle based on the vehicle signal received from the on-board terminal when the user drives the vehicle to enter the parking section and the at least one sensor detects a state of the user is changed between an onboard state and a non-onboard state, and
transmit parking information and parking reservation information to the server, the parking information includes the user information, the identification information, and the parking time information and the parking reservation information is information of a parking reservation request for a parking lot; and the second control unit is programmed to
store the parking reservation information for the parking section,
receive the parking information from the mobile terminal, and
determine whether parking of a vehicle in the parking section matches reservation details based on the parking reservation information and the parking information, wherein
when a parking start instruction has not been received from the user for more than a predetermined time after the parking start time has been identified, the first control unit is further configured to give a notification for promoting an instruction to start parking to the user, and
when a parking end instruction has not been received from the user for more than a predetermined time after the parking end time has been identified, the first control unit is further configured to give another notification for promoting another instruction to end parking to the user.

* * * * *